United States Patent
Ishige et al.

(10) Patent No.: US 11,987,296 B2
(45) Date of Patent: May 21, 2024

(54) STEERING DEVICE

(71) Applicant: SHOWA CORPORATION, Gyoda (JP)

(72) Inventors: Shingo Ishige, Haga-gun (JP); Yusuke Anma, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 797 days.

(21) Appl. No.: 17/063,344

(22) Filed: Oct. 5, 2020

(65) Prior Publication Data

US 2021/0016824 A1 Jan. 21, 2021

Related U.S. Application Data

(63) Continuation-in-part of application No. PCT/JP2018/019492, filed on May 21, 2018.

(51) Int. Cl.
*B62D 5/04* (2006.01)
*H02P 25/22* (2006.01)
*H02P 29/028* (2016.01)

(52) U.S. Cl.
CPC ......... *B62D 5/0463* (2013.01); *B62D 5/0481* (2013.01); *H02P 25/22* (2013.01); *H02P 29/028* (2013.01)

(58) Field of Classification Search
CPC .................................................. B62D 5/0463
See application file for complete search history.

(56) References Cited

U.S. PATENT DOCUMENTS

| | | | |
|---|---|---|---|
| 2005/0159866 A1* | 7/2005 | Takeuchi | B62D 5/003 180/443 |
| 2011/0156627 A1 | 6/2011 | Nakamura et al. | |
| 2020/0023886 A1 | 1/2020 | Yatsugi et al. | |
| 2020/0247462 A1 | 8/2020 | Akutsu et al. | |

FOREIGN PATENT DOCUMENTS

| | | | |
|---|---|---|---|
| JP | 2002-037112 | 2/2002 | |
| JP | 2012-111474 | 6/2012 | |
| JP | 2012111474 A * | 6/2012 | ........... B62D 5/0403 |
| JP | 2017-055488 | 3/2017 | |
| WO | WO-2017047279 A1 * | 3/2017 | ........... B62D 5/0403 |
| WO | WO-2017/115411 A1 | 7/2017 | |

OTHER PUBLICATIONS

International Search Report dated Jul. 3, 2018 for the corresponding PCT International Patent Application No. PCT/JP2018/019492.

* cited by examiner

*Primary Examiner* — Jacob D Knutson
(74) *Attorney, Agent, or Firm* — Leason Ellis LLP; Melvin C. Garner; Edward J. Ellis

(57) ABSTRACT

A steering device includes: a plurality of electric motors 10 configured to be driven to turn wheels of a vehicle; and three or more drive systems 20 each configured to output a driving force for driving a corresponding one of the electric motors 10 to the corresponding one of the electric motors 10. A total of maximum driving forces each of which is a maximum value of a driving force of each drive system 20 of the steering device is set larger than a required driving force required to turn the wheels with the vehicle stationary, and in an event of a failure occurring in one of the three or more drive systems 20, a total of the maximum driving forces of other properly working drive systems 20 out of the three or more drive systems 20 amounts to the required driving force.

8 Claims, 14 Drawing Sheets

STEERING DEVICE

CROSS-REFERENCE TO RELATED APPLICATIONS

This application is a continuation-in-part of PCT application No. PCT/JP2018/019492 filed on May 21, 2018, the content of which is incorporated herein by reference in its entirety.

FIELD OF THE INVENTION

The present invention relates to a steering device.

BACKGROUND OF THE INVENTION

Recently some proposals have been made of providing a fail-safe function to a steering device equipped with a steer-by-wire system, in which a steering wheel and wheels are not mechanically connected but mechanically separated, in order to ensure continuation of the steering wheel operation in the event of a failure.

For example, a steering device disclosed in Japanese Patent Application Laid-Open Publication No. 2002-037112 drives a steering mechanism using a dual steering drive system including a main steering drive system and a sub steering drive system. A main steering actuator and a sub steering actuator are mechanically linked via a link mechanism having play and are always driven. The presence or absence of interference between the main steering drive system and the sub steering drive system is detected by a mutual interference detection mechanism. Each of a main control unit and a sub control unit shuts down its corresponding steering drive system when an abnormality occurs in that system. Also, each of the control units forcibly stops the other steering drive system upon detection of mutual interference between the drive systems while its corresponding drive system is working properly.

Technical Problem

Due to a steering wheel and wheels not being mechanically connected, a steering device equipped with a steer-by-wire system is particularly required to have a function that ensures turning of the wheels and continuation of the steering wheel operation in the event of a failure. Thus, one may consider providing multiple drive systems and, in the event of a failure occurring in one of the drive systems, causing the wheels to be turned by another one of the drive systems. However, providing multiple drive systems often leads to increase in size of the device as a whole.

An object of the present invention is to provide a steering device that is reduced in size and reliably ensures turning of the wheels even in the event of a failure occurring in one of the drive systems.

SUMMARY OF THE INVENTION

Solution to Problem

With the above object in view, a first aspect of the present invention is a steering device including: one or more electric motors configured to be driven to turn wheels of a vehicle; and three or more drive systems each configured to output a driving force for driving a corresponding one of the electric motors to the corresponding one of the electric motors, wherein a total of maximum driving forces each of which is a maximum value of a driving force of each drive system of the steering device is set larger than a required driving force required to turn the wheels with the vehicle stationary, and in an event of a failure occurring in one of the three or more drive systems, a total of the maximum driving forces of other properly working drive systems out of the three or more drive systems amounts to the required driving force.

Advantageous Effects of Invention

The present invention helps reduce the size of the steering device and also reliably ensures that the wheels can be turned even in the event of a failure occurring in one of the drive systems.

DETAILED DESCRIPTION OF THE INVENTION

Embodiments of the present invention will be described below in detail with reference to the attached drawings.

First Embodiment

Figure 1:
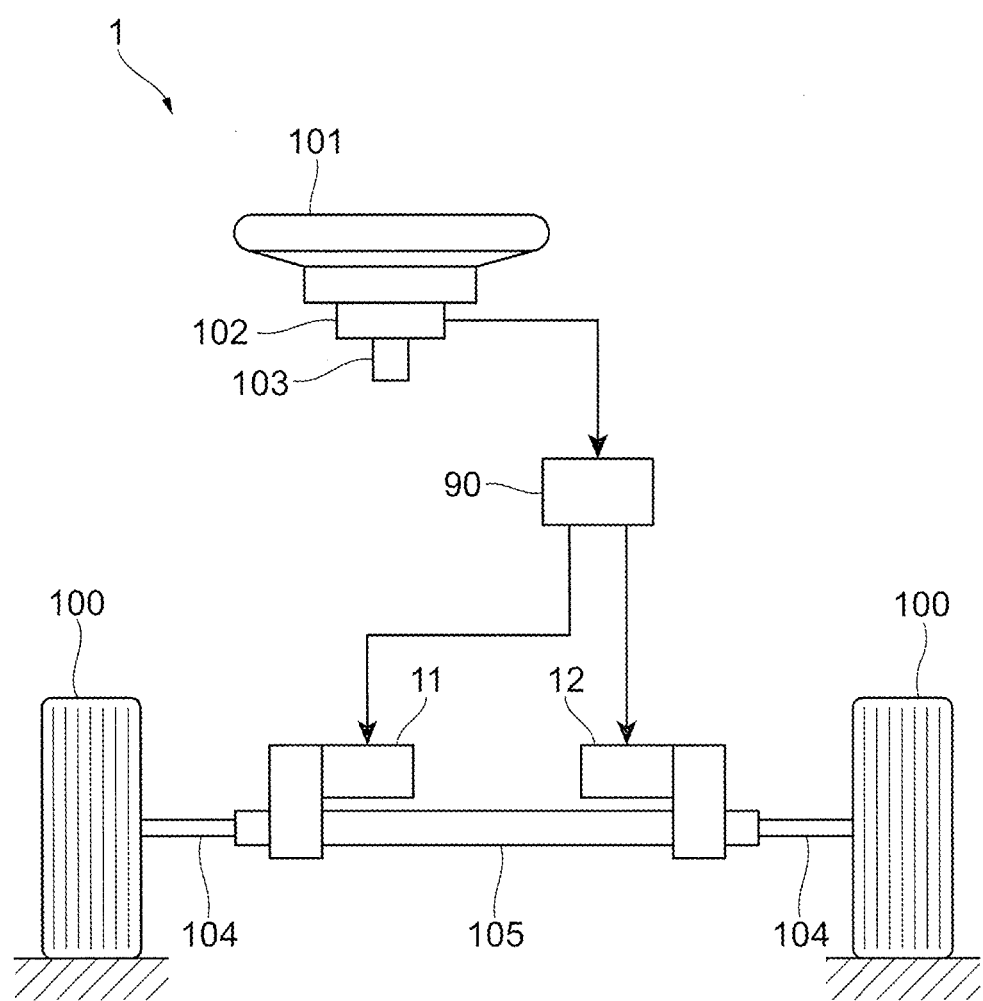
FIG. 1 shows a schematic configuration of a steering device according to the first embodiment.

FIG. 1 shows a schematic configuration of a steering device 1 according to the first embodiment.

Figure 2:
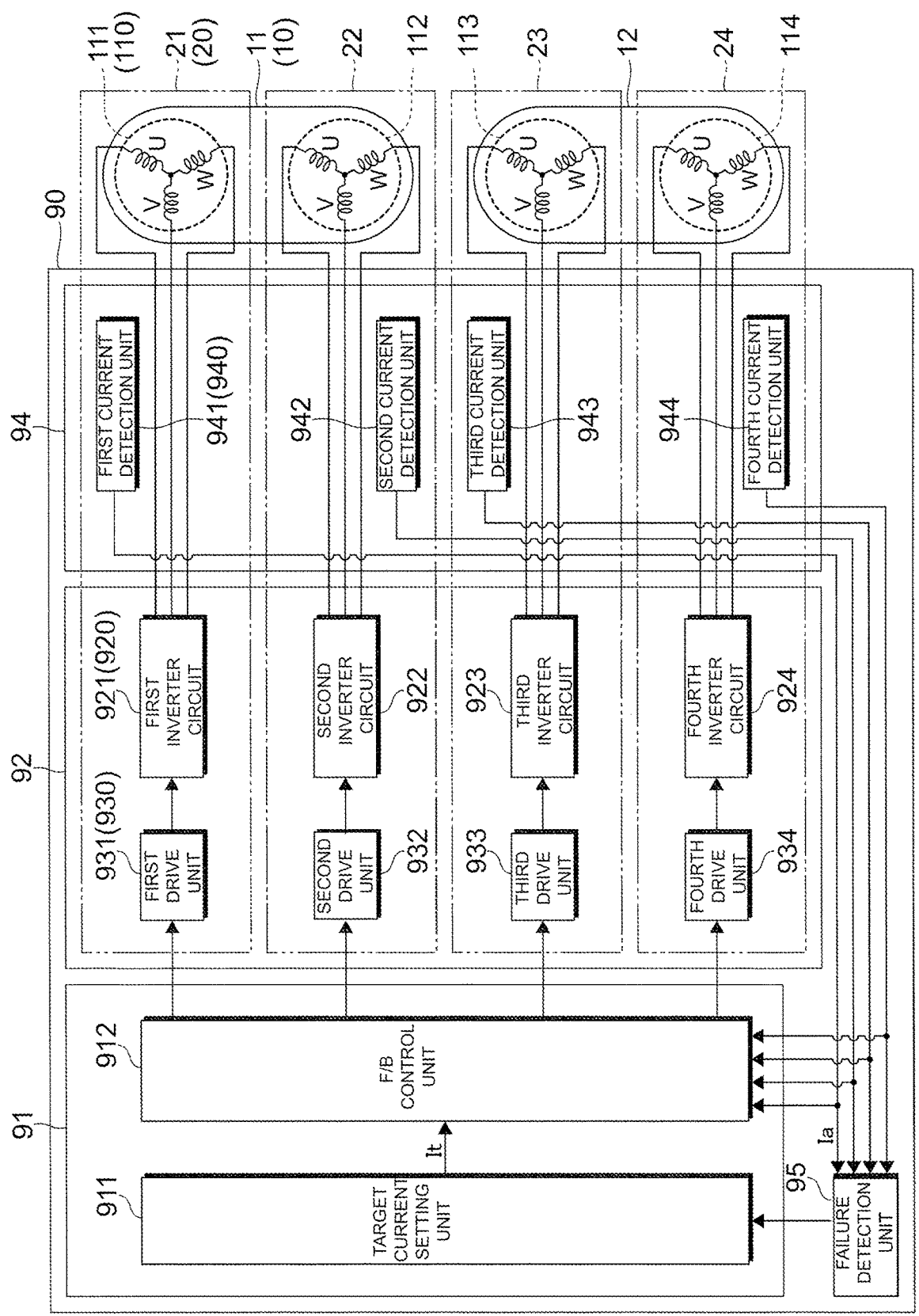
FIG. 2 shows schematic configurations of a control device and electric motors according to the first embodiment.

FIG. 2 shows schematic configurations of a control device 90 and electric motors 10 according to the first embodiment.

The steering device 1 is a rack-assist type electric power steering device to change a traveling direction of an automobile as an example of a vehicle to any direction by turning front wheels 100 of the automobile. The steering device 1 is equipped with a so-called steer-by-wire system, in which a wheel-like steering wheel (handle) 101 operated by a driver to change a traveling direction of the automobile and the front wheels 100 are not mechanically connected.

The steering device 1 includes a steering angle sensor 102 detecting a steering angle θs of the steering wheel 101, and a reaction force device 103 applying a steering reaction force to the driver.

The steering device 1 further includes tie rods 104 connected to respective knuckle arms fixed to the respective front wheels 100, and a rack shaft 105 connected to the tie rods 104.

The steering device 1 further includes two electric motors of a first electric motor 11 and a second electric motor 12, and two conversion units (not shown) converting rotational driving forces of the first electric motor 11 and the second electric motor 12, respectively, into axial motion of the rack shaft 105. Hereinafter, the first electric motor 11 and the second electric motor 12 may be each referred to as an "electric motor 10" when it is not necessary to distinguish between them.

Each conversion unit includes a driving pulley (not shown) mounted on an output shaft of the corresponding electric motor 10, a number of balls (not shown), and a ball nut (not shown) attached via the balls to a ball screw (not shown) formed on the rack shaft 105. Each conversion unit further includes a driven pulley (not shown) rotating together with the ball nut, and an endless belt (not shown) stretched between the driving pulley and the driven pulley.

(Electric Motor)

The first electric motor 11 is a double three-phase motor including two winding sets of double three-phase windings composed of a first winding set 111 and a second winding set 112. A maximum output when only the first winding set 111 is energized and a maximum output when only the second winding set 112 is energized are the same.

The second electric motor 12 is a double three-phase motor including two winding sets of double three-phase windings composed of a third winding set 113 and a fourth winding set 114. A maximum output when only the third winding set 113 is energized and a maximum output when only the fourth winding set 114 is energized are the same. Also, a maximum output when only the third winding set 113 is energized and the maximum output when only the first winding set 111 of the first electric motor 11 is energized are the same.

The first winding set 111, the second winding set 112, the third winding set 113, and the fourth winding set 114 may be each referred to as a "winding set 110" when it is not necessary to distinguish between them.

(Control Device)

The steering device 1 further includes a control device 90 to control operations of the first electric motor 11 and the second electric motor 12.

The control device 90 includes a motor drive control unit 91 calculating a control amount by which the operations of the two electric motors 10 are controlled, and a motor drive unit 92 driving the two electric motors 10 on the basis of the control amount. The control device 90 further includes a current detection unit 94 detecting an actual current Ia that actually flows through each electric motor 10, and a failure detection unit 95 detecting a failure in any of driving systems (described later) on the basis of the current detected by the current detection unit 94.

(Motor Drive Control Unit)

The motor drive control unit 91 includes an arithmetic logic circuit composed of a CPU, a flash ROM, a RAM, a backup RAM and the like. The motor drive control unit 91 includes a target current setting unit 911 setting a target current It to be supplied to the two electric motors 10. The motor drive control unit 91 further includes a feedback (F/B) control unit 912 performing feedback control on the basis of a deviation between the target current It set by the target current setting unit 911 and the actual current Ia supplied to the electric motors 10 detected by the current detection unit 94.

The target current setting unit 911 sets the target current It on the basis of factors such as the steering angle detected by the steering angle sensor 102.

The F/B control unit 912 calculates a deviation between the target current It and the actual current Ia detected by the current detection unit 94 and performs feedback control to null the deviation.

(Motor Drive Unit)

The motor drive unit 92 includes a first inverter circuit 921 and a second inverter circuit 922 that supply power-supply voltage from a battery (not shown) installed in the automobile to the first winding set 111 and the second winding set 112, respectively, of the first electric motor 11. The motor drive unit 92 further includes a third inverter circuit 923 and a fourth inverter circuit 924 that supply power-supply voltage from the battery (not shown) to the third winding set 113 and the fourth winding set 114, respectively, of the second electric motor 12.

Hereinafter, the first inverter circuit 921, the second inverter circuit 922, the third inverter circuit 923, and the fourth inverter circuit 924 may be each referred to as an "inverter circuit 920" when it is not necessary to distinguish between them.

The motor drive unit 92 further includes a first drive unit 931 and a second drive unit 932 that control driving of the first inverter circuit 921 and the second inverter circuit 922, respectively, on the basis of drive command signals from the motor drive control unit 91. The motor drive unit 92 further includes a third drive unit 933 and a fourth drive unit 934 that control driving of the third inverter circuit 923 and the fourth inverter circuit 924, respectively, on the basis of drive command signals from the motor drive control unit 91.

Hereinafter, the first drive unit 931, the second drive unit 932, the third drive unit 933, and the fourth drive unit 934 may be each referred to as a "drive unit 930" when it is not necessary to distinguish between them.

Each inverter circuit 920 is configured as a bridge circuit and includes six independent transistors (not shown) as multiple pairs of switching elements. In the present embodiment, each inverter circuit 920 includes a pair of transistors (not shown) for each phase (three phases of U-phase, V-phase, and W-phase) of each winding set 110 of the electric motors 10. For example, the transistor is one of power transistors of various structures including bipolar transistors, field effect transistors, and MOS transistors.

On the basis of the drive command signals from the motor drive control unit 91, each drive unit 930 generates, for example, pulse width modulation (PWM) signals for PWM-driving the corresponding electric motor 10 and outputs the generated PWM signals.

(Current Detection Unit)

The current detection unit 94 includes a first current detection unit 941 detecting the actual current Ia actually flowing through the first winding set 111 of the first electric motor 11, and a second current detection unit 942 detecting the actual current Ia actually flowing through the second winding set 112 of the first electric motor 11. The current detection unit 94 further includes a third current detection unit 943 detecting the actual current Ia actually flowing through the third winding set 113 of the second electric motor 12, and a fourth current detection unit 944 detecting the actual current Ia actually flowing through the fourth winding set 114 of the second electric motor 12. The first current detection unit 941, the second current detection unit 942, the third current detection unit 943, and the fourth current detection unit 944 may be each referred to as a "current detection unit 940" when it is not necessary to distinguish between them.

(Failure Detection Unit)

When a value of the actual current Ia detected by the current detection unit 940 exceeds values of a predetermined normal area or falls below the normal area, the failure detection unit 95 determines that a failure has occurred in the drive system 20 having that current detection unit 940.

(Drive System)

The above configured steering device 1 according to the first embodiment includes four drive systems of a first drive system 21, a second drive system 22, a third drive system 23, and a fourth drive system 24 that output driving forces for moving the rack shaft 105 and eventually turning the front wheels 100.

The first drive system 21 is composed of the first winding set 111 of the first electric motor 11, the first inverter circuit 921 and the first drive unit 931 of the motor drive unit 92, and the first current detection unit 941 of the current detection unit 94.

The second drive system 22 is composed of the second winding set 112 of the first electric motor 11, the second inverter circuit 922 and the second drive unit 932 of the motor drive unit 92, and the second current detection unit 942 of the current detection unit 94.

The third drive system 23 is composed of the third winding set 113 of the second electric motor 12, the third inverter circuit 923 and the third drive unit 933 of the motor drive unit 92, and the third current detection unit 943 of the current detection unit 94.

The fourth drive system 24 is composed of the fourth winding set 114 of the second electric motor 12, the fourth inverter circuit 924 and the fourth drive unit 934 of the motor drive unit 92, and the fourth current detection unit 944 of the current detection unit 94.

The first drive system 21, the second drive system 22, the third drive system 23, and the fourth drive system 24 may be each referred to as a "drive system 20" when it is not necessary to distinguish between them.

Hereinafter, a driving force of the first electric motor 11 that is produced when the first inverter circuit 921 of the motor drive unit 92 is driven to energize the first winding set 111 of the first electric motor 11 is referred to as a driving force of the first drive system 21.

Also, a driving force of the first electric motor 11 that is produced when the second inverter circuit 922 of the motor drive unit 92 is driven to energize the second winding set 112 of the first electric motor 11 is hereinafter referred to as a driving force of the second drive system 22.

Also, a driving force of the second electric motor 12 that is produced when the third inverter circuit 923 of the motor drive unit 92 is driven to energize the third winding set 113 of the second electric motor 12 is hereinafter referred to as a driving force of the third drive system 23.

Also, a driving force of the second electric motor 12 that is produced when the fourth inverter circuit 924 of the motor drive unit 92 is driven to energize the fourth winding set 114 of the second electric motor 12 is hereinafter referred to as a driving force of the fourth drive system 24.

The steering device 1 according to the first embodiment is set such that a total maximum driving force that is the sum of maximum driving forces of the first drive system 21, the second drive system 22, the third drive system 23, and the fourth drive system 24 is 4/3 times a maximum required driving force required to turn the front wheels 100. The maximum driving forces of the four drive systems 20 are the same.

Accordingly, when one of the four drive systems 20 is having a failure, the total maximum driving force that is output from the other properly working drive systems 20 without any failure is 3/3=1 times the maximum required driving force required to turn the front wheels 100.

It should be noted that the maximum required driving force refers to a driving force by which the front wheels 100 are made to turn up to a predetermined maximum turning angle when the steering wheel is turned up to a predetermined maximum steering angle with the automobile stationary on a road surface having a predetermined friction coefficient (e.g., asphalt road) with the vehicle speed Vc, which is a moving speed of the automobile, being zero. The maximum required driving force varies depending on the kind of the vehicle (e.g., automobile).

(Control of the Drive Systems)

Figure 3:
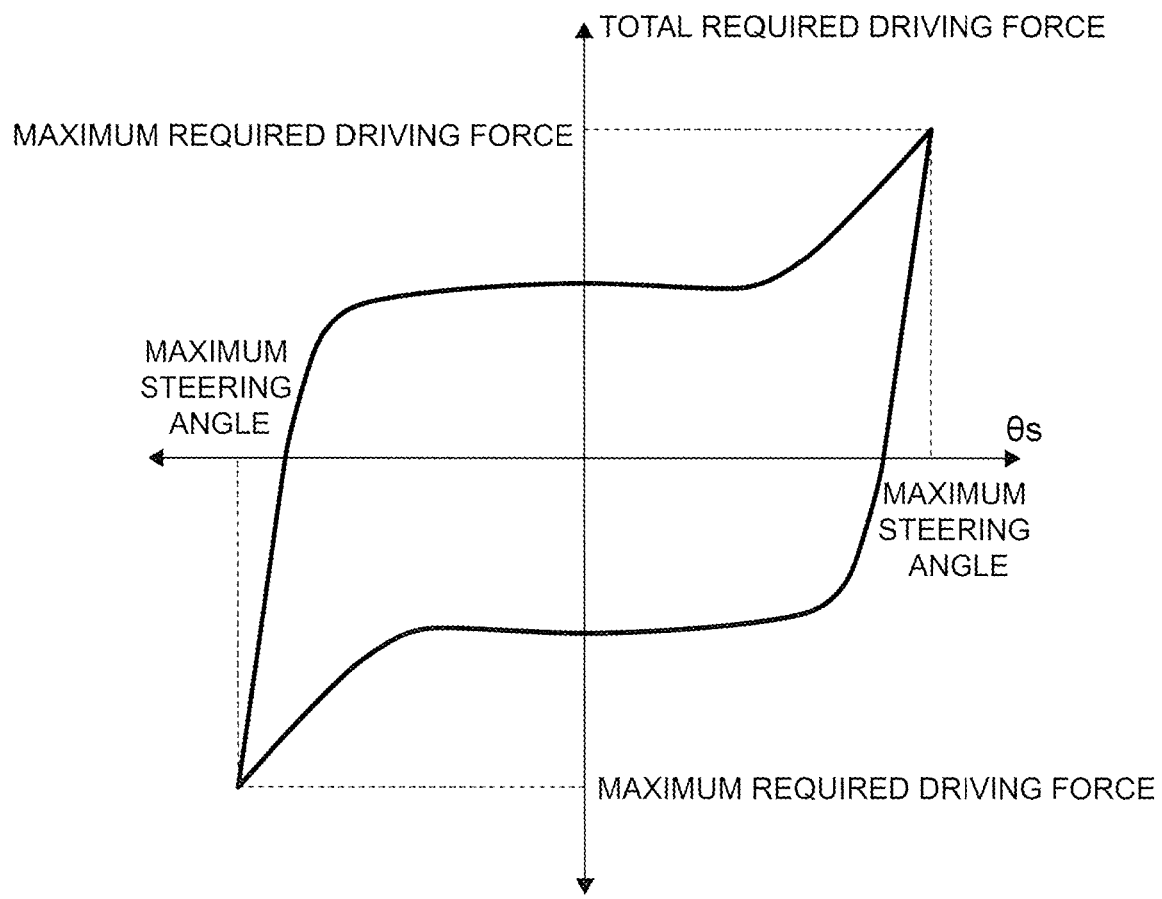
FIG. 3 shows correlation between a steering angle and a required assist force (total required driving force) when a vehicle speed Vc is zero.

FIG. 3 shows correlation between the steering angle θs and a required assist force (total required driving force) when the vehicle speed Vc is zero.

The control device 90 controls the drive systems 20 on the basis of the steering angle θs detected by the steering angle sensor 102.

When all of the four drive systems 20 are working properly, the control device 90 grasps an assist force required for the steering device 1 (hereinafter may be referred to as a "required assist force") on the basis of the steering angle θs and a correlation that is set for each vehicle speed Vc and stored in the ROM in advance, like one shown in FIG. 3. The control device 90 then grasps the thus-grasped required assist force as a total required driving force required for the steering device 1 (hereinafter may be simply referred to as a "required driving force").

(First Control Example)

Figure 4:
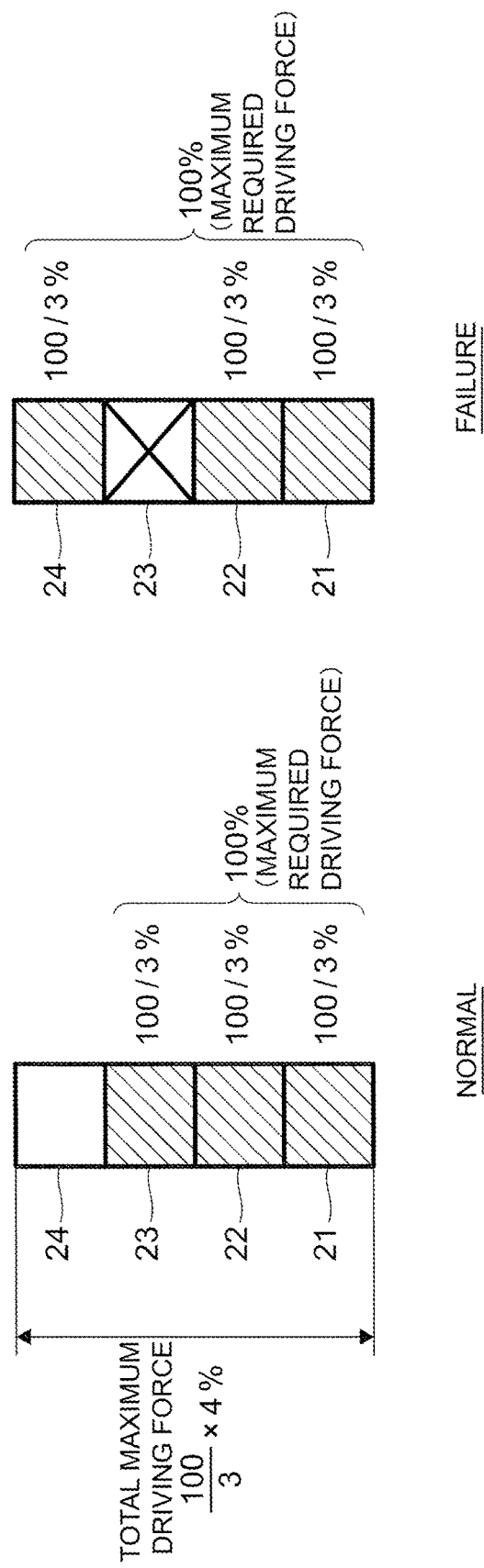
FIG. 4 exemplarily shows switching control of driving forces of drive systems according to the first control example.

FIG. 4 exemplarily shows switching control of driving forces of the drive systems 20 according to the first control example.

In the first control example, the control device 90 controls driving forces of the drive systems 20 such that the total required driving force is output by three out of the four drive systems 20. Also, the control device 90 controls such that all driving forces of the three drive systems 20 are the same. That is, the control device 90 controls such that the driving force of each drive system 20 equals a value that is obtained by dividing the total required driving force by a value obtained by subtracting one from the number of drivable drive systems 20 (the driving force of each drive system 20=the total required driving force/(4-1)). In this manner, the control device 90 controls such that the driving force of each drive system 20 is 100/3% of the total required driving force.

When the three drive systems 20 of the first drive system 21, the second drive system 22, and the third drive system 23 are driven, the target current setting unit 911 sets the target current It to be supplied to the winding sets 110 (the first winding set 111, the second winding set 112, and the third winding set 113) of the respective drive systems 20 such that the driving force of each of these drive systems 20 equals ⅓ of the total required driving force. The F/B control unit 912 performs feedback control such that a deviation between the target current It set by the target current setting unit 911 and the actual current Ia detected by the current detection unit 94 becomes zero.

When an error has occurred in one of the three drive systems 20, the control device 90 drives, in place of that drive system 20 having the failure, another drive system 20 that has not been driven at the time of occurrence of the failure. The control device 90 then controls driving forces of these properly working three drive systems 20 without any failure such that the total required driving force is output by these three drive systems 20. At that time, the control device 90 controls such that all driving forces of the three drive systems 20 are the same. That is, the control device 90 controls such that the driving force of each drive system 20 equals a value that is obtained by dividing the total required driving force by the number of drivable drive systems 20 (the driving force of each drive system 20=the total required driving force/3). In this manner, the control device 90 controls such that the driving force of each drive system 20 is 100/3% of the total required driving force.

For example, when an error has occurred in the third drive system 23 while the first drive system 21, the second drive system 22, and the third drive system 23 are being driven, the control device 90 stops driving the third drive system 23 and drives the fourth drive system 24.

The target current setting unit 911 sets to zero the target current It to be supplied to the third winding set 113 of the third drive system 23 having the failure, and sets the target current It to be supplied to the winding sets 110 of the three properly working drive systems 20 of the first drive system 21, the second drive system 22, and the fourth drive system 24 such that the driving force of each of these three drive systems 20 equals ⅓ of the total required driving force.

As described above, when, during three of the four drive systems 20 without any failure being driven, a failure has occurred in one of these three drive systems 20, the control device 90 performs the following control in the first control example. That is, the control device 90 stops driving the drive system 20 having the failure, and drives another drive system 20 that has not been driven at the time of occurrence of the failure, without changing the ratio of the driving force of each of the properly working drive systems 20 that have been driven at the time of occurrence of the failure to the total required driving force. More specifically, the control device 90 maintains the ratio of the driving force of each of the properly working drive systems 20 that have been driven at the time of occurrence of the failure to the total required driving force at 100/3% and sets the ratio of the driving force of the drive system 20 that has not been driven at the time of occurrence of the failure to the total required driving force at 100/3%.

(Second Control Example)

Figure 5:
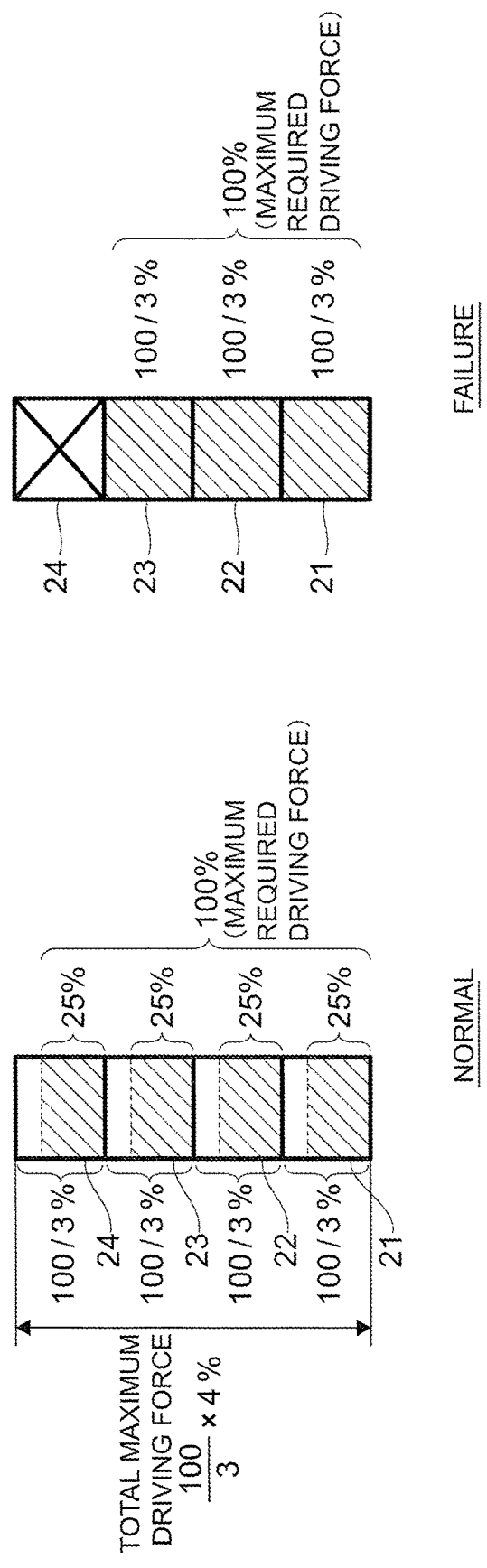
FIG. 5 exemplarily shows switching control of driving forces of the drive systems according to the second control example.

FIG. 5 exemplarily shows switching control of driving forces of the drive systems 20 according to the second control example.

In the second control example, the control device 90 controls driving forces of the drive systems 20 such that the total required driving force is output by all four drive systems 20. Also, the control device 90 controls such that all driving forces of the four drive systems 20 are the same. That is, the control device 90 controls such that the driving force of each drive system 20 equals a value that is obtained by dividing the total required driving force by the number of drivable drive systems 20 (the driving force of each drive system 20=the total required driving force/4). In other words, the control device 90 controls such that the driving force of each drive system 20 is 25% of the total required driving force.

The target current setting unit 911 sets the target current It to be supplied to the winding sets 110 of the respective drive systems 20 such that the driving force of each drive system 20 equals ¼ of the total required driving force. The F/B control unit 912 performs feedback control such that a deviation between the target current It set by the target current setting unit 911 and the actual current Ia detected by the current detection unit 94 becomes zero.

In the second control example, when a failure has occurred in one of the four drive systems 20, the control device 90 controls driving forces of the other properly working three drive systems 20 without any failure such that the total required driving force is output by these three drive systems 20. At that time, the control device 90 controls such that all driving forces of the three drive systems 20 are the same. That is, the control device 90 controls such that the driving force of each drive system 20 equals a value that is obtained by dividing the total required driving force by the number of properly working drive systems 20 (the driving force of each drive system 20=the total required driving force/3). In other words, the control device 90 controls such that the driving force of each drive system 20 is 100/3% of the total required driving force.

The target current setting unit 911 sets to zero the target current It to be supplied to the winding set 110 of the drive system 20 having the failure, and sets the target current It to be supplied to the respective winding sets 110 of the three properly working drive systems 20 without any failure such that the driving force of each of these three drive systems 20 equals ⅓ of the total required driving force.

As described above, when, during all four drive systems 20 without any failure being driven, a failure has occurred in one of the four drive systems 20, the control device 90 in the second control example increases the ratio of the driving force of each of the other three drive systems 20 without any failure to the total required driving force. More specifically, the control device 90 changes the ratio of the driving force of each of the properly working three drive systems 20 to the total required driving force from 25% to 100/3%. In this manner, the control device 90 uniformly increases the ratio of the driving force of each of the properly working three drive systems 20 to the total required driving force.

In the above configured steering device 1 according to the first embodiment, when a failure has occurred in one of the four drive systems 20, the assist force required for the steering device 1 (required assist force) is output from the other three drive systems 20. The total maximum driving force output from three drive systems 20 is set equal to the maximum required driving force required to turn the front wheels 100. In other words, the steering device 1 according to the first embodiment is a steering device including the multiple electric motors 10 that are driven to turn the front wheels 100 as an example of the wheels of the automobile as an example of the vehicle, and the three or more drive systems 20 each output a driving force for driving the corresponding electric motor 10 to the corresponding electric motor 10. The total of the maximum driving forces each of which is a maximum value of the driving force of each drive system 20 provided in the steering device 1 is set larger than the required driving force required to turn the front wheels 100 with the automobile stationary, and even when a failure has occurred in one of the three or more drive systems 20, the total of the maximum driving forces of the other properly working drive systems 20 out of the three or more drive systems amounts to the required driving force. The steering device 1 according to the first embodiment includes the two electric motors 10 and the four drive systems 20, and the drive systems 20 each include the corresponding winding set 110 that outputs the driving force of the corresponding electric motor 10 by being energized. The first electric motor 11, which is an example of the first electric motor, includes two winding sets 110 and is driven by the two drive systems 20 of the first drive system 21 and the second drive system 22. The second electric motor 12, which is an example of the second electric motor, includes two winding sets 110 and is driven by the two drive systems 20 of the third drive system 23 and the fourth drive system 24. Thus, even when a failure has occurred in one of the drive systems 20, the front wheels 100 can be turned in the same manner as before the occurrence of the failure and the steering wheel 101 can continue to be operated. Also, as compared to a configuration in which a total of the maximum driving forces from three drive systems 20 is larger than the maximum required driving force, the above-described configuration can reduce the maximum driving force of each drive system 20, which in turn can reduce output capacities of the electric motors 10. As a result, this can reduce the size of the electric motors 10 of the steering device 1 according to the first embodiment as compared to the configuration in which a total of the maximum driving forces from three drive systems 20 is larger than the maximum required driving force, and thus can improve mountability of the electric motors 10 onto vehicles (e.g., automobiles).

The steering device 1 according to the first embodiment further includes the control device 90 as an example the controller. In the event of a failure occurring in one of the four drive systems 20, the control device 90 controls driving forces of the other properly working drive systems 20 without any failure such that the required driving force required to turn the front wheels 100 with the automobile stationary is output from these properly working drive systems 20 out of the four drive systems 20.

In the steering device 1, the four drive systems 20 include three normal output drive systems (e.g., the first drive system 21, the second drive system 22, and the third drive system 23) each of which outputs a driving force to the corresponding electric motor 10 when none of the drive systems 20 are having a failure, and one backup drive system (e.g., the fourth drive system 24) that does not output a driving force to the corresponding electric motor 10 when none of the drive systems 20 are having a failure. In the first control example, when none of the normal output drive systems are having a failure, the control device 90 controls each of the normal output drive systems to output the maximum driving force, and when a failure has occurred in one of the three normal output drive systems, the control device 90 controls driving forces of the other properly working normal output drive systems so as to keep their respective ratios to the required driving force, and further controls the backup drive system to output the maximum driving force.

As such, in the first control example, prior to occurrence of any failure in one of the drive systems 20, not all of the four drive systems 20 are driven but only three drive systems 20 that are sufficient to output the maximum required driving force are driven.

Also, when none of all the drive systems 20 are having a failure, the control device 90 controls each of the drive systems 20 to output a driving force smaller than the maximum driving force, and when a failure has occurred in one of the four drive systems 20, the control device 90 controls each of the properly working drive systems 20 to output the maximum driving force. As such, in the second control example, all of the four drive systems 20 are used to output the total required driving force, which allows to reduce output of the electric motors 10 as compared to when three or less drive systems 20 are used to output the total required driving force. This helps reduce noise and reduce vibration. Additionally, this allows for smooth switching of driving forces before and after occurrence of a failure, as compared to when three or less drive systems 20 are used to output the total required driving force.

While, in the above embodiment, the control device 90 controls the driven drive systems 20 to output uniform driving forces, the present invention is not limited to this embodiment.

For example, instead of the three drive systems 20 outputting the driving forces each equal to 100/3% of the total required driving force, the driving forces of the three drive systems 20 may be, for example, 40%, 30%, and 20%, respectively. Alternatively, the ratio of each of the driving forces of the three drive systems 20 may be any other ratio as long as a total of these drive forces amounts to 100% of the total required driving force.

Instead of each of the driving forces of the four drive systems 20 accounting for 25% of the total required driving force, the ratio of each of the driving forces may be changed to any other ratio as long as a total of these driving forces of the four drive systems 20 amounts to 100% of the total required driving force. In such a case, the control device 90 may control such that, when none of the drive systems 20 are having a failure, a total of driving forces of two drive systems 20 for driving one electric motor 10 (e.g., the first electric motor 11) is larger than a total of driving forces of other two drive systems 20 for driving the other electric motor 10 (e.g., the second electric motor 12). Also, the ratio of each of driving forces of two drive systems 20 for driving one corresponding electric motor 10 (e.g., the first electric motor 11 or the second electric motor 12) may be the same as each other. For example, the ratio of each of the driving forces of the first drive system 21 and the second drive system 22 may be 30%, and the ratio of each of the driving forces of the third drive system 23 and the fourth drive system 24 may be 20%. Equalizing the ratios of the driving forces of two drive systems 20 each applying a driving force to one corresponding electric motor 10 can reduce vibrations.

When a total of the driving forces of the two drive systems 20 for driving one electric motor 10 is made larger than a total of the driving forces of other two drive systems 20 for driving the other electric motor 10, a total of maximum driving forces of the two drive systems 20 for driving the one electric motor 10 may be made larger than a total of maximum driving forces of the other two drive systems 20 for driving the other electric motor 10. For example, the maximum driving force of each of the first drive system 21 and the second drive system 22 may be 40% of the maximum required driving force, and the maximum driving force of each of the third drive system 23 and the fourth drive system 24 may be 30% of the maximum required driving force. In this case too, the ratio of each drive system 20 to the required driving force may be adjusted according to the second control example.

While, in the above embodiment, the control device 90 separate from the electric motors 10 includes the inverter circuits 920, the present invention is not limited to this embodiment. The electric motors 10 may include the inverter circuits 920. For example, the first electric motor 11 may include the first inverter circuit 921 and the second inverter circuit 922 respectively supplying power-supply voltage to the first winding set 111 and the second winding set 112 of the first electric motor 11. Also, the second electric motor 12 may include the third inverter circuit 923 and the fourth inverter circuit 924 respectively supplying power-supply voltage to the third winding set 113 and the fourth winding set 114 of the second electric motor 12.

In that case, the first electric motor 11 may include the first drive unit 931 and the second drive unit 932 respectively controlling driving of the first inverter circuit 921 and the second inverter circuit 922 of the first electric motor 11. Also, the second electric motor 12 may include the third drive unit 933 and the fourth drive unit 934 respectively controlling driving of the third inverter circuit 923 and the fourth inverter circuit 924 of the second electric motor 12.

Second Embodiment

Figure 6:
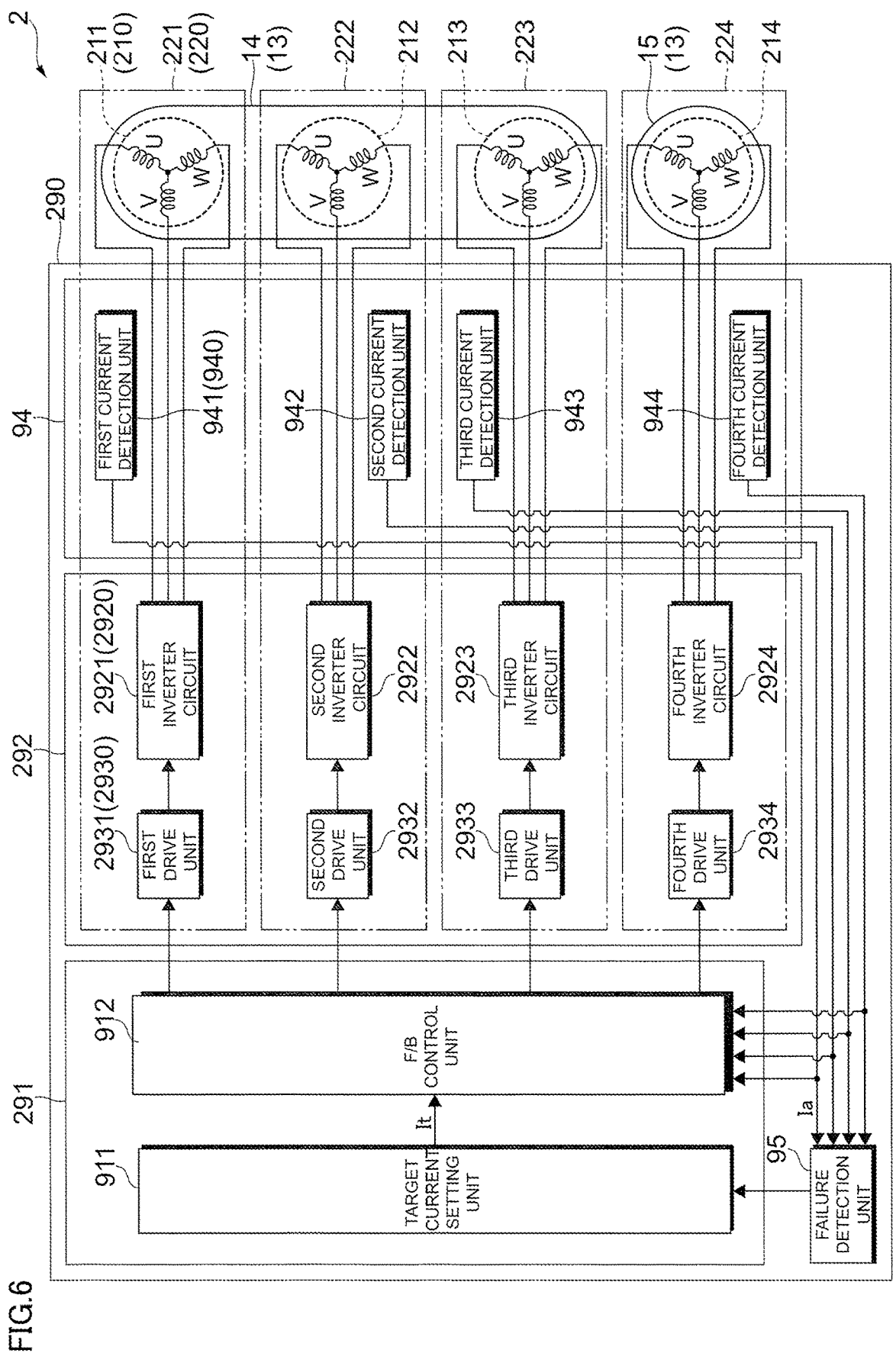
FIG. 6 shows a schematic configuration of a steering device according to the second embodiment.

FIG. 6 shows a schematic configuration of a steering device 2 according to the second embodiment.

The steering device 2 according to the second embodiment differs from the steering device 1 according to the first embodiment in terms of elements constituting drive systems 220 that correspond to the drive systems 20 of the steering device 1. Below a description will be given of differences of the steering device 2 from the steering device 1 according to the first embodiment. The same structures and functions between the steering device 1 according to the first embodiment and the steering device 2 according to the second embodiment are denoted by the respective same reference numerals and detailed description thereof will be omitted.

The steering device 2 includes two electric motors of a first electric motor 14 and a second electric motor 15, and two conversion units (not shown) converting rotational driving forces of the first electric motor 14 and the second electric motor 15, respectively, into axial motion of the rack shaft 105. Hereinafter, the first electric motor 14 and the second electric motor 15 may be each referred to as an "electric motor 13" when it is not necessary to distinguish between them.

(Electric Motor)

The first electric motor 14 is a triple three-phase motor including three winding sets of triple three-phase windings composed of a first winding set 211, a second winding set 212 and a third winding set 213. A maximum output when only the first winding set 211 is energized, a maximum output when only the second winding set 212 is energized, and a maximum output when only the third winding set 213 is energized are the same.

The second electric motor 15 is a three-phase motor including only one winding set of a three-phase winding composed of a fourth winding set 214. A maximum output when only the fourth winding set 214 is energized and the maximum output when only the first winding set 211 of the first electric motor 14 is energized are the same.

The first winding set 211, the second winding set 212, the third winding set 213, and the fourth winding set 214 may be each referred to as a "winding set 210" when it is not necessary to distinguish between them.

(Control Device)

The steering device 2 further includes a control device 290 to control operations of the first electric motor 14 and the second electric motor 15.

As shown in FIG. 6, the control device 290 includes a motor drive control unit 291 calculating a control amount by which the operations of the two electric motors 13 are controlled, and a motor drive unit 292 driving the two electric motors 13 on the basis of the control amount. The motor drive control unit 291 corresponds to the motor drive control unit 91 of the control device 90 of the steering device 1 according to the first embodiment.

Similarly to the control device 90 of the steering device 1 according to the first embodiment, the control device 290 further includes the current detection unit 94 and the failure detection unit 95.

(Motor Drive Unit)

The motor drive unit 292 includes a first inverter circuit 2921, a second inverter circuit 2922, and a third inverter circuit 2923 that supply power-supply voltage from a battery (not shown) installed in the automobile to the first winding set 211, the second winding set 212, and the third winding set 213, respectively, of the first electric motor 14. The motor drive unit 292 further includes a fourth inverter circuit 2924 that supplies power-supply voltage from the battery (not shown) to the fourth winding set 214 of the second electric motor 15.

Hereinafter, the first inverter circuit 2921, the second inverter circuit 2922, the third inverter circuit 2923, and the fourth inverter circuit 2924 may be each referred to as an "inverter circuit 2920" when it is not necessary to distinguish between them.

Each inverter circuit 2920 has the same structure and function as each inverter circuit 920 according to the first embodiment.

The motor drive unit 292 further includes a first drive unit 2931 and a second drive unit 2932 that control driving of the first inverter circuit 2921 and the second inverter circuit 2922, respectively, on the basis of drive command signals from the motor drive control unit 291. The motor drive unit 292 further includes a third drive unit 2933 and a fourth drive unit 2934 that control driving of the third inverter circuit 2923 and the fourth inverter circuit 2924, respectively, on the basis of drive command signals from the motor drive control unit 291.

Hereinafter, the first drive unit 2931, the second drive unit 2932, the third drive unit 2933, and the fourth drive unit 2934 may be each referred to as a "drive unit 2930" when it is not necessary to distinguish between them.

Each drive unit 2930 has the same structure and function as each drive unit 930 according to the first embodiment.

(Drive System)

The above configured steering device 2 according to the second embodiment includes four drive systems of a first drive system 221, a second drive system 222, a third drive system 223, and a fourth drive system 224 that output driving forces for moving the rack shaft 105.

The first drive system 221 is composed of the first winding set 211 of the first electric motor 14, the first inverter circuit 2921 and the first drive unit 2931 of the motor drive unit 292, and the first current detection unit 941 of the current detection unit 94.

The second drive system 222 is composed of the second winding set 212 of the first electric motor 14, the second inverter circuit 2922 and the second drive unit 2932 of the motor drive unit 292, and the second current detection unit 942 of the current detection unit 94.

The third drive system 223 is composed of the third winding set 213 of the first electric motor 14, the third inverter circuit 2923 and the third drive unit 2933 of the motor drive unit 292, and the third current detection unit 943 of the current detection unit 94.

The fourth drive system 224 is composed of the fourth winding set 214 of the second electric motor 15, the fourth inverter circuit 2924 and the fourth drive unit 2934 of the motor drive unit 292, and the fourth current detection unit 944 of the current detection unit 94.

The first drive system 221, the second drive system 222, the third drive system 223, and the fourth drive system 224 may be each referred to as a "drive system 220" when it is not necessary to distinguish between them.

Similarly to the steering device 1 according to the first embodiment, the steering device 2 according to the second embodiment is set such that a total maximum driving force that is the sum of maximum driving forces of the first to fourth drive systems 221-224 is 4/3 times the maximum required driving force required to turn the front wheels 100. The maximum driving forces of the four drive systems 220 are the same.

Accordingly, when one of the four drive systems 220 is having a failure, the total maximum driving force that is output from the other properly working drive systems 220 without any failure is 3/3=1 times the maximum required driving force required to turn the front wheels 100.

(First Control Example)

In the first control example of the steering device 2 according to the second embodiment, when all of the drive systems 220 are working properly, the control device 290 controls driving forces of the drive systems 220 such that the total required driving force is output by three out of the four drive systems 220, similarly to the first control example of the steering device 1 according to the first embodiment. Also, the control device 290 controls such that all driving forces of the three drive systems 220 are the same.

When an error has occurred in one of the three drive systems 220, the control device 290 drives, in place of that drive system 220 having the failure, another drive system 220 that has not been driven at the time of occurrence of the failure.

It should be noted that, when all of the drive systems 220 are working properly, the control device 290 may drive the first electric motor 14 and leave the second electric motor 15 undriven. Specifically, the control device 290 may energize the first to third winding sets 211-213 of the first electric motor 14 and may leave the fourth winding set 214 of the second electric motor 15 unenergized.

Alternatively, when all of the drive systems 220 are working properly, the control device 290 may drive both of the first electric motor 14 and the second electric motor 15. Specifically, the control device 290 may energize two winding sets 210 out of the first to third winding sets 211-213 of the first electric motor 14 and the fourth winding set 214 of the second electric motor 15.

(Second Control Example)

In the second control example of the steering device 2 according to the second embodiment, when all of the drive systems 220 are working properly, the control device 290 controls driving forces of the drive systems 220 such that the total required driving force is output by all four drive systems 220, similarly to the second control example of the steering device 1 according to the first embodiment.

The above configured steering device 2 according to the second embodiment includes the two electric motors 13 and the four drive systems 220, and the drive systems 220 each include the corresponding winding set 210 that outputs the driving force of the corresponding electric motor 13 by being energized. The first electric motor 14, which is an example of the first electric motor, includes three winding sets 210 and is driven by the three drive systems 220 of the first drive system 221, the second drive system 222, and the third drive system 223. The second electric motor 15, which is an example of the second electric motor, includes the one winding set 210 and is driven by the one drive system 220 of the fourth drive system 224.

The steering device 2 according to the second embodiment further includes the control device 290 as an example the controller. In the event of a failure occurring in one of the four drive systems 220, the control device 290 controls driving forces of the other properly working drive systems 220 without any failure such that the required driving force required to turn the front wheels 100 with the automobile stationary is output from these properly working drive systems 220 out of the four drive systems 220.

In the steering device 2, the four drive systems 220 include three normal output drive systems (e.g., the first drive system 221, the second drive system 222, and the third drive system 223) each of which outputs a driving force to the corresponding electric motor 13 when none of the drive systems 220 are having a failure, and one backup drive system (e.g., the fourth drive system 224) that does not output a driving force to the corresponding electric motor 13 when none of the drive systems 220 are having a failure. In the first control example, when none of the normal output drive systems are having a failure, the control device 290 controls each of the normal output drive systems to output the maximum driving force, and when a failure has occurred in one of the three normal output drive systems, the control device 290 controls driving forces of the other properly working normal output drive systems so as to keep their respective ratios to the required driving force, and further controls the backup drive system to output the maximum driving force. By way of example, the first electric motor 14 is driven by the first drive system 221, the second drive system 222, and the third drive system 223, which are the normal output drive systems, and the second electric motor 15 is driven by the fourth drive system 224, which is the backup drive system. Driving forces of the three drive systems 220 for driving the first electric motor 14 are uniform.

In the second control example, when none of the drive systems 220 are having a failure, the control device 290 controls each of the drive systems 220 to output a driving force smaller than the maximum driving force, and when a failure has occurred in one of the four drive systems 220, the control device 290 controls each of the properly working drive systems 220 to output the maximum driving force. Also, when none of the drive systems 220 are having a failure, the control device 290 makes uniform all driving forces of the drive systems 220.

In the above configured steering device 2 according to the second embodiment too, when a failure has occurred in one of the four drive systems 220, the assist force required for the steering device 2 (required assist force) is output from the other three drive systems 220. The total maximum driving force output from three drive systems 220 is set equal to the maximum required driving force required to turn the front wheels 100. Thus, even when a failure has occurred in one of the drive systems 220, the front wheels 100 can be turned in the same manner as before the occurrence of the failure and the steering wheel 101 can continue to be operated. Also, as compared to a configuration in which a total of the maximum driving forces from three drive systems 220 is larger than the maximum required driving force, the above-described configuration can reduce the maximum driving force of each drive system 220, which in turn can reduce output capacities of the electric motors 13. As a result, this can reduce the size of the electric motors 13 of the steering device 2 according to the second embodiment as compared to the configuration in which a total of the maximum driving forces from three drive systems 220 is larger than the maximum required driving force, and thus can improve mountability of the electric motors 13 onto vehicles (e.g., automobiles).

In the second control example of the above embodiment, instead of each of the driving forces of the four drive systems 220 accounting for 25% of the total required driving force, the ratio of each of the driving forces may be changed to any other ratio as long as a total of these driving forces of the four drive systems 220 amounts to 100% of the total required driving force. In such a case, the control device 290 may control such that, when none of the drive systems 220 are having a failure, a total of driving forces of three drive systems 220 for driving one electric motor 13 (e.g., the first electric motor 14) is larger than a driving force of the other one drive system 220 for driving the other electric motor 13 (e.g., the second electric motor 15). Also, the ratio of each of driving forces of the three drive systems 220 for driving the first electric motor 14 may be the same as each other. For example, the ratio of each of the driving forces of the first drive system 221, the second drive system 222, and the third drive system 223 may be 30%, and the ratio of the driving force of the fourth drive system 224 may be 10%. Equalizing the ratios of the driving forces of the three drive systems 220 each applying a driving force to the first electric motor 14 can reduce vibrations.

When a total of the driving forces of the three drive systems 220 for driving the first electric motor 14 is made larger than the driving force of the fourth drive system 224 for driving the second electric motor 15, a total of maximum driving forces of the three drive systems 220 for driving the first electric motor 14 may be made larger than a total of a maximum driving force of the fourth drive system 224 for driving the second electric motor 15. For example, the maximum driving force of each of the first drive system 221, the second drive system 222, and the third drive system 223 may be 30% of the maximum required driving force, and the maximum driving force of the fourth drive system 224 may be 10% of the maximum required driving force. In this case too, the ratio of each drive system 220 to the required driving force may be adjusted according to the second control example.

Third Embodiment

Figure 7:
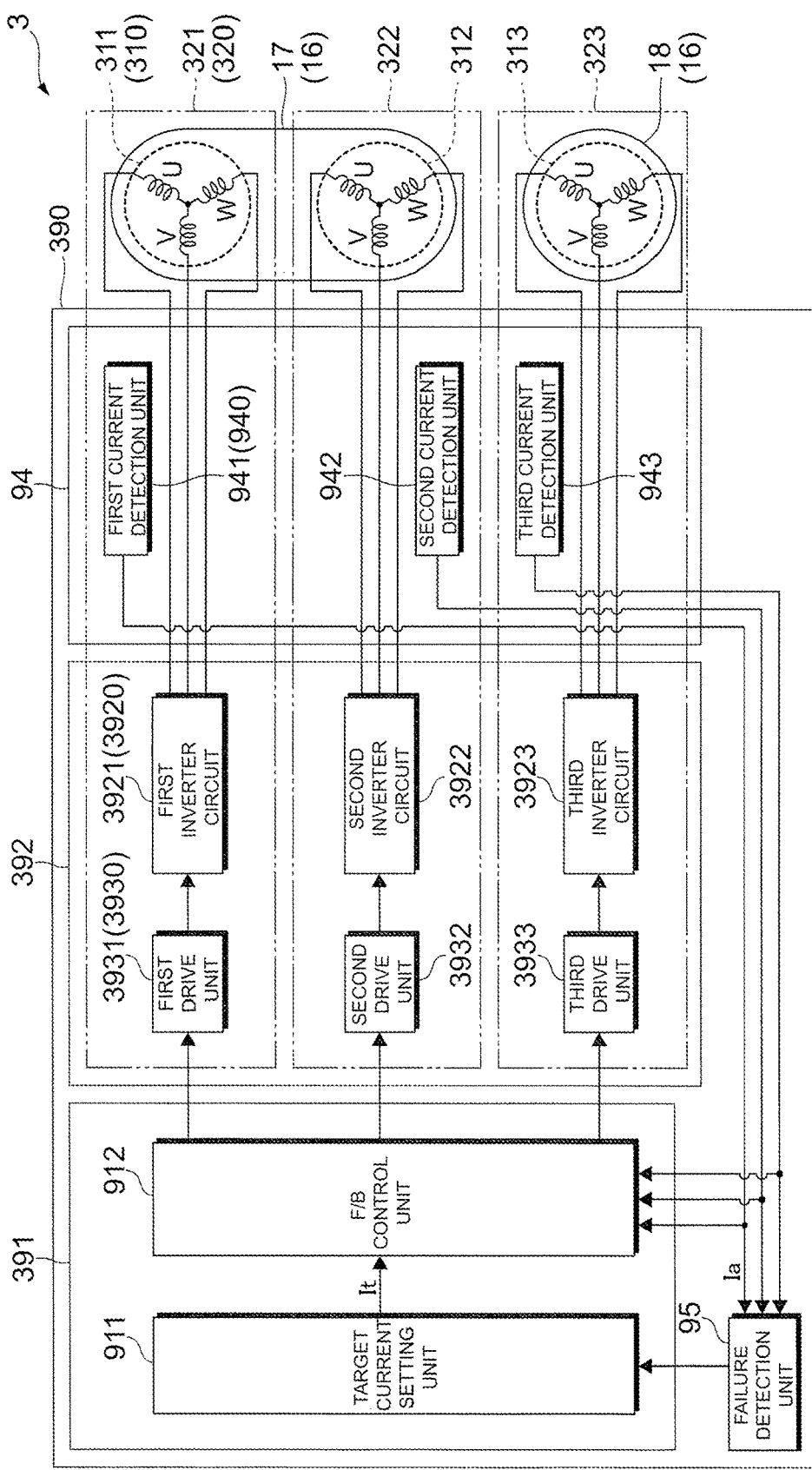
FIG. 7 shows a schematic configuration of a steering device according to the third embodiment.

FIG. 7 shows a schematic configuration of a steering device 3 according to the third embodiment.

The steering device 3 according to the third embodiment differs from the steering device 1 according to the first embodiment in terms of elements constituting drive systems 320 that correspond to the drive systems 20 of the steering device 1 and also in terms of the number of such elements. Below a description will be given of differences of the steering device 3 from the steering device 1 according to the first embodiment. The same structures and functions between the steering device 1 according to the first embodiment and the steering device 3 according to the third embodiment are denoted by the respective same reference numerals and detailed description thereof will be omitted.

The steering device 3 includes two electric motors of a first electric motor 17 and a second electric motor 18, and two conversion units (not shown) converting rotational driving forces of the first electric motor 17 and the second electric motor 18, respectively, into axial motion of the rack shaft 105. Hereinafter, the first electric motor 17 and the second electric motor 18 may be each referred to as an "electric motor 16" when it is not necessary to distinguish between them.

(Electric Motor)

Similarly to the first electric motor 11 according to the first embodiment, the first electric motor 17 is a double three-phase motor including two winding sets of double three-phase windings composed of a first winding set 311 and a second winding set 312. A maximum output when only the first winding set 311 is energized and a maximum output when only the second winding set 312 is energized are the same.

The second electric motor 18 is a three-phase motor including only one winding set of a three-phase winding composed of a third winding set 313. A maximum output when only the third winding set 313 is energized and the maximum output when only the first winding set 311 of the first electric motor 17 is energized are the same.

The first winding set 311, the second winding set 312, and the third winding set 313 may be each referred to as a "winding set 310" when it is not necessary to distinguish between them.

(Control Device)

The steering device 3 further includes a control device 390 to control operations of the first electric motor 17 and the second electric motor 18.

As shown in FIG. 7, the control device 390 includes a motor drive control unit 391 calculating a control amount by which the operations of the two electric motors 16 are controlled, and a motor drive unit 392 driving the two electric motors 16 on the basis of the control amount. The motor drive control unit 391 corresponds to the motor drive control unit 91 of the control device 90 of the steering device 1 according to the first embodiment.

Similarly to the control device 90 of the steering device 1 according to the first embodiment, the control device 390 further includes the current detection unit 94 and the failure detection unit 95.

(Motor Drive Unit)

The motor drive unit 392 includes a first inverter circuit 3921 and a second inverter circuit 3922 that supply power-supply voltage from a battery (not shown) installed in the automobile to the first winding set 311 and the second winding set 312, respectively, of the first electric motor 17. The motor drive unit 392 further includes a third inverter circuit 3923 that supplies power-supply voltage from the battery (not shown) to the third winding set 313 of the second electric motor 18.

Hereinafter, the first inverter circuit 3921, the second inverter circuit 3922, and the third inverter circuit 3923 may be each referred to as an "inverter circuit 3920" when it is not necessary to distinguish between them.

Each inverter circuit 3920 has the same structure and function as each inverter circuit 920 according to the first embodiment.

The motor drive unit 392 further includes a first drive unit 3931 and a second drive unit 3932 that control driving of the first inverter circuit 3921 and the second inverter circuit 3922, respectively, on the basis of drive command signals from the motor drive control unit 391. The motor drive unit 392 further includes a third drive unit 3933 that controls driving of the third inverter circuit 3923 on the basis of drive command signals from the motor drive control unit 391.

Hereinafter, the first drive unit 3931, the second drive unit 3932, and the third drive unit 3933 may be each referred to as a "drive unit 3930" when it is not necessary to distinguish between them.

Each drive unit 3930 has the same structure and function as each drive unit 930 according to the first embodiment.

(Drive System)

The above configured steering device 3 according to the third embodiment includes three drive systems of a first drive system 321, a second drive system 322, and a third drive system 323 that output driving forces for moving the rack shaft 105.

The first drive system 321 is composed of the first winding set 311 of the first electric motor 17, the first inverter circuit 3921 and the first drive unit 3931 of the motor drive unit 392, and the first current detection unit 941 of the current detection unit 94.

The second drive system 322 is composed of the second winding set 312 of the first electric motor 17, the second inverter circuit 3922 and the second drive unit 3932 of the motor drive unit 392, and the second current detection unit 942 of the current detection unit 94.

The third drive system 323 is composed of the third winding set 313 of the second electric motor 18, the third inverter circuit 3923 and the third drive unit 3933 of the motor drive unit 392, and the third current detection unit 943 of the current detection unit 94.

The first drive system 321, the second drive system 322, and the third drive system 323 may be each referred to as a "drive system 320" when it is not necessary to distinguish between them.

The steering device 3 according to the third embodiment is set such that a total maximum driving force that is the sum of maximum driving forces of the first to third drive systems 321-323 is 3/2 times the maximum required driving force required to turn the front wheels 100. The maximum driving forces of the three drive systems 320 are the same.

Accordingly, when one of the three drive systems 320 is having a failure, the total maximum driving force that is output from the other properly working drive systems 320 without any failure is 2/2=1 times the maximum required driving force required to turn the front wheels 100.

(Control of the Drive Systems)

When all of the three drive systems 320 are working properly, the control device 390 grasps an assist force required for the steering device 3 (hereinafter may be referred to as a "required assist force") on the basis of the steering angle θs and a correlation that is set for each vehicle speed Vc and stored in the ROM in advance, like one shown in FIG. 3. The control device 390 then grasps the thus-grasped required assist force as a total required driving force required for the steering device 3.

(First Control Example)

Figure 8:
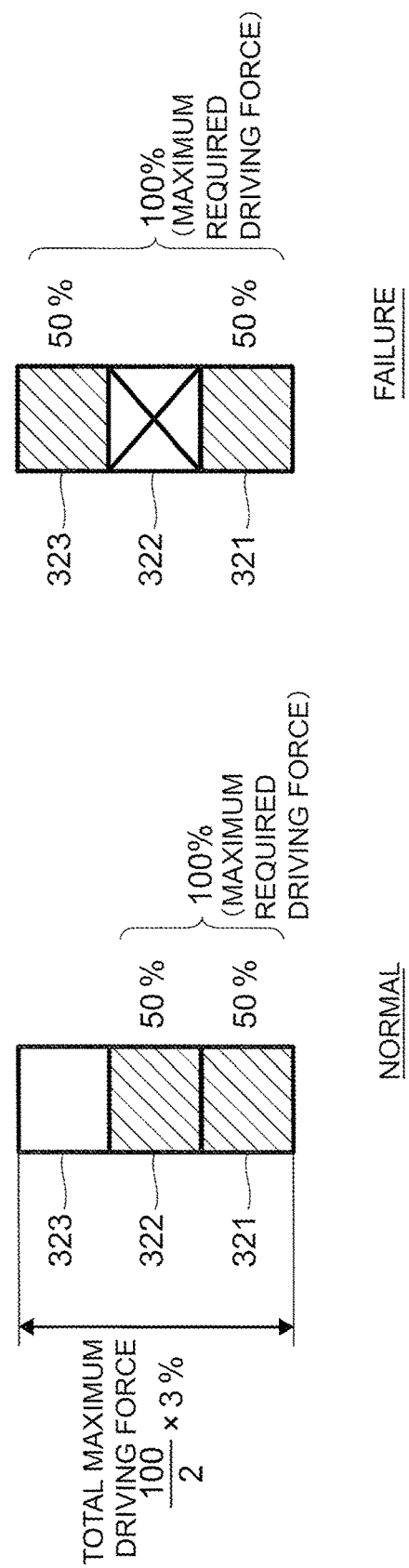
FIG. 8 exemplarily shows switching control of driving forces of drive systems according to the first control example.

FIG. 8 exemplarily shows switching control of driving forces of the drive systems 320 according to the first control example.

In the first control example, the control device 390 controls driving forces of the drive systems 320 such that the total required driving force is output by two out of the three drive systems 320. Also, the control device 390 controls such that all driving forces of the two drive systems 320 are the same. That is, the control device 390 controls such that the driving force of each drive system 320 equals a value that is obtained by dividing the total required driving force by a value obtained by subtracting one from the number of drivable drive systems 320 (the driving force of each drive system 320=the total required driving force/(3−1)). In this manner, the control device 390 controls such that the driving force of each drive system 320 is 100/2=50% of the total required driving force.

When, for example, the two drive systems 320 of the first drive system 321 and the second drive system 322 are driven, the target current setting unit 911 of the motor drive control unit 391 according to the third embodiment sets the target current It to be supplied to the winding sets 310 (the first winding set 311 and the second winding set 312) of the respective drive systems 320 such that the driving force of each of these drive systems 320 equals ½ of the total required driving force. The F/B control unit 912 of the motor drive control unit 391 according to the third embodiment performs feedback control such that a deviation between the target current It set by the target current setting unit 911 and the actual current Ia detected by the current detection unit 94 becomes zero.

When an error has occurred in one of the two drive systems 320, the control device 390 drives, in place of that drive system 320 having the failure, another drive system 320 that has not been driven at the time of occurrence of the failure. The control device 390 then controls driving forces of these properly working two drive systems 320 without any failure such that the total required driving force is output by these two drive systems 320. At that time, the control device 390 controls such that all driving forces of the two drive systems 320 are the same. That is, the control device 390 controls such that the driving force of each drive system 320 equals a value that is obtained by dividing the total required driving force by the number of drivable drive systems 320 (the driving force of each drive system 320=the total required driving force/2). In this manner, the control device 390 controls such that the driving force of each drive system 320 is 100/2=50% of the total required driving force.

For example, when an error has occurred in the second drive system 322 while the first drive system 321 and the second drive system 322 are being driven, the control device 390 stops driving the second drive system 322 and drives the third drive system 323.

The target current setting unit 911 sets to zero the target current It to be supplied to the second winding set 312 of the second drive system 322 having the failure, and sets the target current It to be supplied to the winding sets 310 of the two properly working drive systems 320 of the first drive system 321 and the third drive system 323 such that the driving force of each of these two drive systems 320 equals ½=50% of the total required driving force.

As described above, when, during two of the three drive systems 320 without any failure being driven, a failure has occurred in one of these two drive systems 320, the control device 390 performs the following control in the first control example. That is, the control device 390 stops driving the drive system 320 having the failure, and drives another drive system 320 that has not been driven at the time of occurrence of the failure, without changing the ratio of the driving force of the properly working drive system 320 that has been driven at the time of occurrence of the failure to the total required driving force. More specifically, the control device 390 maintains the ratio of the driving force of the properly working drive system 320 that has been driven at the time of occurrence of the failure to the total required driving force at 100/2=50% and sets the ratio of the driving force of the drive system 320 that has not been driven at the time of occurrence of the failure to the total required driving force at 100/2=50%.

It should be noted that, when all of the drive systems 320 are working properly, the control device 390 may drive the first electric motor 17 and leave the second electric motor 18 undriven. Specifically, the control device 390 may energize the first winding set 311 and the second winding set 312 of the first electric motor 17 and may leave the third winding set 313 of the second electric motor 18 unenergized.

Alternatively, when all of the drive systems 320 are working properly, the control device 390 may drive both of the first electric motor 17 and the second electric motor 18. Specifically, the control device 390 may energize one winding set 310 out of the first winding set 311 and the second winding set 312 of the first electric motor 17 and the third winding set 313 of the second electric motor 18.

(Second Control Example)

Figure 9:
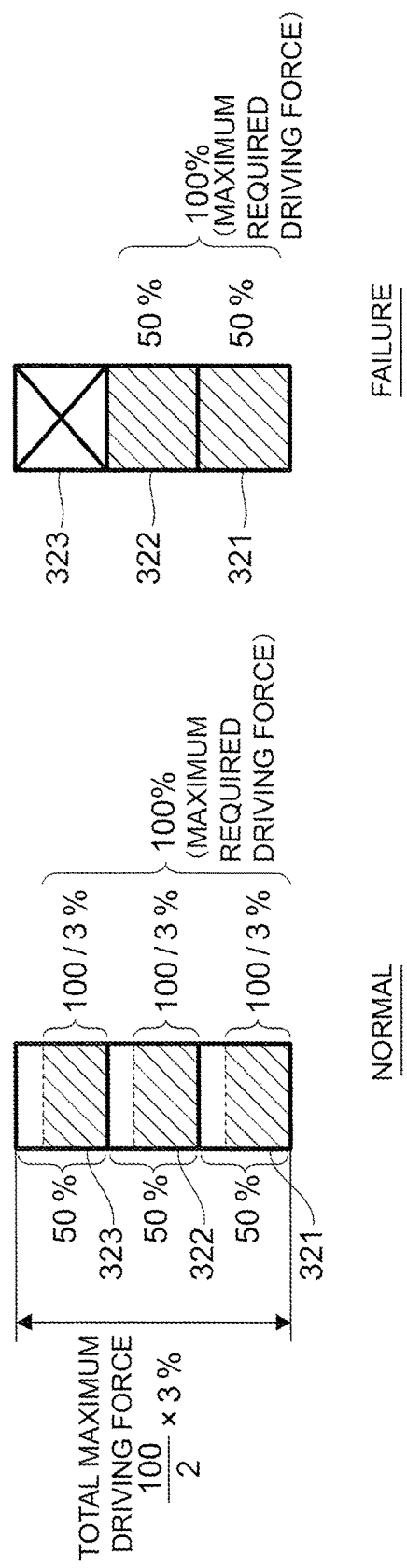
FIG. 9 exemplarily shows switching control of driving forces of drive systems according to the second control example.

FIG. 9 exemplarily shows switching control of driving forces of the drive systems 320 according to the second control example.

In the second control example, the control device 390 controls driving forces of the drive systems 320 such that the total required driving force is output by all three drive systems 320. Also, the control device 390 controls such that all driving forces of the three drive systems 320 are the same. That is, the control device 390 controls such that the driving force of each drive system 320 equals a value that is obtained by dividing the total required driving force by the number of drivable drive systems 320 (the driving force of each drive system 320=the total required driving force/3). In other words, the control device 390 controls such that the driving force of each drive system 320 is 100/3% of the total required driving force.

The target current setting unit 911 of the motor drive control unit 391 according to the third embodiment sets the target current It to be supplied to the winding sets 310 of the respective drive systems 320 such that the driving force of each drive system 320 equals ⅓ of the total required driving force. The F/B control unit 912 of the motor drive control unit 391 according to the third embodiment performs feedback control such that a deviation between the target current It set by the target current setting unit 911 and the actual current Ia detected by the current detection unit 94 becomes zero.

In the second control example, when a failure has occurred in one of the three drive systems 320, the control device 390 controls driving forces of the other properly working two drive systems 320 without any failure such that the total required driving force is output by these two drive systems 320. At that time, the control device 390 controls such that all driving forces of the two drive systems 320 are the same. That is, the control device 390 controls such that the driving force of each drive system 320 equals a value that is obtained by dividing the total required driving force by the number of properly working drive systems 320 (the driving force of each drive system 320=the total required driving force/2). In other words, the control device 390 controls such that the driving force of each drive system 320 is 100/2% of the total required driving force.

The target current setting unit 911 of the motor drive control unit 391 sets to zero the target current It to be supplied to the winding set 310 of the drive system 320 having the failure, and sets the target current It to be supplied to the respective winding sets 310 of the two properly working drive systems 320 without any failure such that the driving force of each of these two drive systems 320 equals ½ of the total required driving force.

As described above, when, during all three drive systems 320 without any failure being driven, a failure has occurred in one of the three drive systems 320, the control device 390 in the second control example increases the ratio of the driving force of each of the other two drive systems 320 without any failure to the total required driving force. More specifically, the control device 390 changes the ratio of the driving force of each of the properly working two drive systems 320 to the total required driving force from 100/3% to 100/2=50%. In this manner, the control device 390 uniformly increases the ratio of the driving force of each of the properly working two drive systems 320 to the total required driving force.

The above configured steering device 3 according to the third embodiment includes the two electric motors 16 and the three drive systems 320, and the drive systems 320 each include the corresponding winding set 310 that outputs the driving force of the corresponding electric motor 16 by being energized. The first electric motor 17, which is an example of the first electric motor, includes two winding sets 310 and is driven by the two drive systems 320 of the first drive system 321 and the second drive system 322. The second electric motor 18, which is an example of the second electric motor, includes the one winding set 310 and is driven by the one drive system 320 of the third drive system 323.

The steering device 3 according to the third embodiment further includes the control device 390 as an example the controller. In the event of a failure occurring in one of the three drive systems 320, the control device 390 controls driving forces of the other properly working drive systems 320 without any failure such that the required driving force required to turn the front wheels 100 with the automobile stationary is output from these properly working drive systems 320 out of the three drive systems 320.

In the steering device 3, the three drive systems 320 include two normal output drive systems (e.g., the first drive system 321 and the second drive system 322) each of which outputs a driving force to the corresponding electric motor 16 when none of the drive systems 320 are having a failure, and one backup drive system (e.g., the third drive system 323) that does not output a driving force to the corresponding electric motor 16 when none of the drive systems 320 are having a failure. In the first control example, when none of the normal output drive systems are having a failure, the control device 390 controls each of the normal output drive systems to output the maximum driving force, and when a failure has occurred in one of the two normal output drive systems, the control device 390 controls a driving force of the other properly working normal output drive system so as to keep its ratio to the required driving force, and further controls the backup drive system to output the maximum driving force. By way of example, the first electric motor 17 is driven by the first drive system 321 and the second drive system 322, which are the normal output drive systems, and the second electric motor 18 is driven by the third drive system 323, which is the backup drive system. Driving forces of the two drive systems 320 for driving the first electric motor 17 are uniform.

In the second control example, when none of the drive systems 320 are having a failure, the control device 390 controls each of the drive systems 320 to output a driving force smaller than the maximum driving force, and when a failure has occurred in one of the three drive systems 320, the control device 390 controls each of the properly working drive systems 320 to output the maximum driving force. Also, when none of the drive systems 320 are having a failure, the control device 390 makes uniform all driving forces of the drive systems 320.

In the above configured steering device 3 according to the third embodiment too, when a failure has occurred in one of the three drive systems 320, the assist force required for the steering device 3 (required assist force) is output from the other two drive systems 320. The total maximum driving force output from the two drive systems 320 is set equal to the maximum required driving force required to turn the front wheels 100. Thus, even when a failure has occurred in one of the drive systems 320, the front wheels 100 can be turned in the same manner as before the occurrence of the failure and the steering wheel 101 can continue to be operated. Also, as compared to a configuration in which a total of the maximum driving forces from two drive systems 320 is larger than the maximum required driving force, the above-described configuration can reduce the maximum driving force of each drive system 320, which in turn can reduce output capacities of the electric motors 16. As a result, this can reduce the size of the electric motors 16 of the steering device 3 according to the third embodiment as compared to the configuration in which a total of the maximum driving forces from two drive systems 320 is larger than the maximum required driving force, and thus can improve mountability of the electric motors 16 onto vehicles (e.g., automobiles).

In the second control example of the above embodiment, instead of each of the driving forces of the three drive systems 320 accounting for 100/3% of the total required driving force, the ratio of each of the driving forces may be changed to any other ratio as long as a total of these driving forces of the three drive systems 320 amounts to 100% of the total required driving force. In such a case, the control device 390 may control such that, when none of the drive systems 320 are having a failure, a total of driving forces of two drive systems 320 for driving one electric motor 16 (e.g., the first electric motor 17) is larger than a driving force of the other one drive system 320 for driving the other electric motor 16 (e.g., the second electric motor 18). Also, the ratio of each of driving forces of the two drive systems 320 for driving the first electric motor 17 may be the same as each other. For example, the ratio of each of the driving forces of the first drive system 321 and the second drive system 322 may be 40%, and the ratio of the driving force of the third drive system 323 may be 20%. Equalizing the ratios of the driving forces of the two drive systems 320 each applying a driving force to the first electric motor 17 can reduce vibrations.

When a total of the driving forces of the two drive systems 320 for driving the first electric motor 17 is made larger than the driving force of the third drive system 323 for driving the second electric motor 18, a total of maximum driving forces of the two drive systems 320 for driving the first electric motor 17 may be made larger than a total of a maximum driving force of the third drive system 323 for driving the second electric motor 18. For example, the maximum driving force of each of the first drive system 321 and the second drive system 322 may be 40% of the maximum required driving force, and the maximum driving force of the third drive system 323 may be 20% of the maximum required driving force. In this case too, the ratio of each drive system 320 to the required driving force may be adjusted according to the second control example.

Fourth Embodiment

Figure 10:
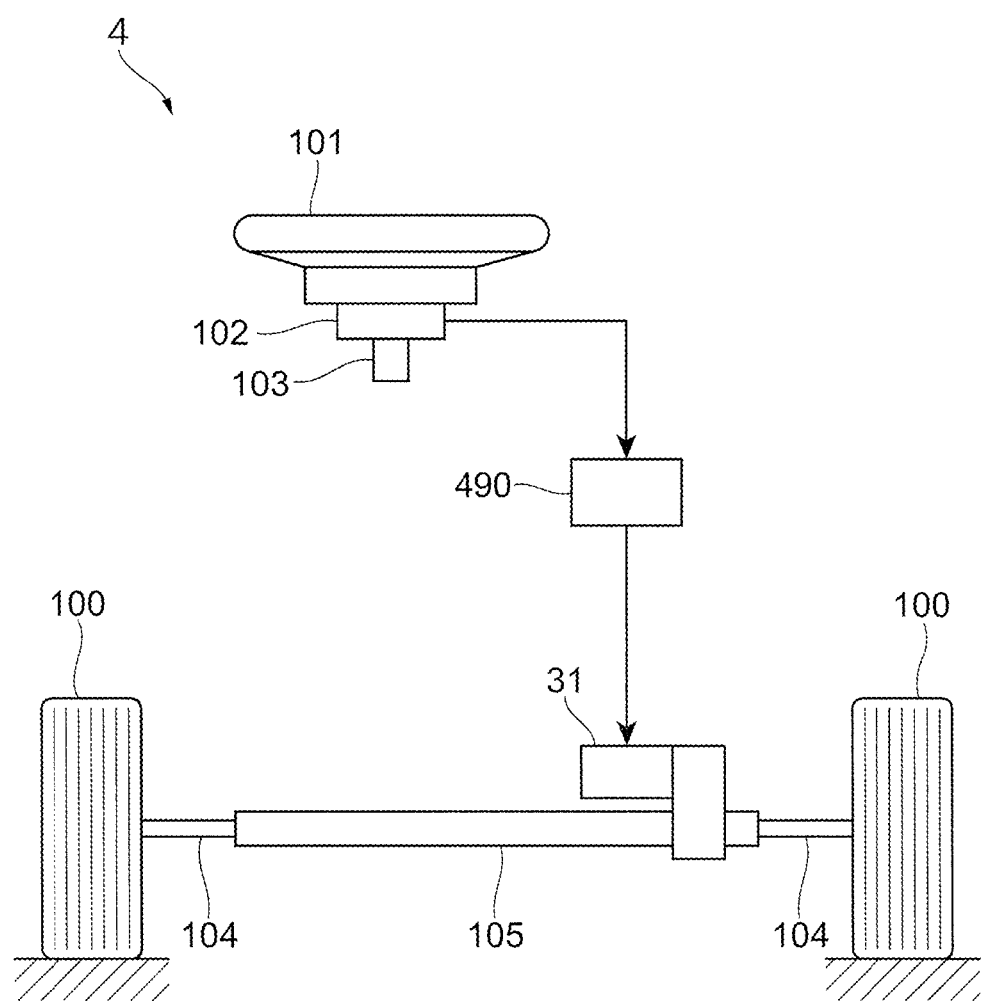
FIG. 10 shows a schematic configuration of a steering device according to the fourth embodiment.

FIG. 10 shows a schematic configuration of a steering device 4 according to the fourth embodiment.

Figure 11:
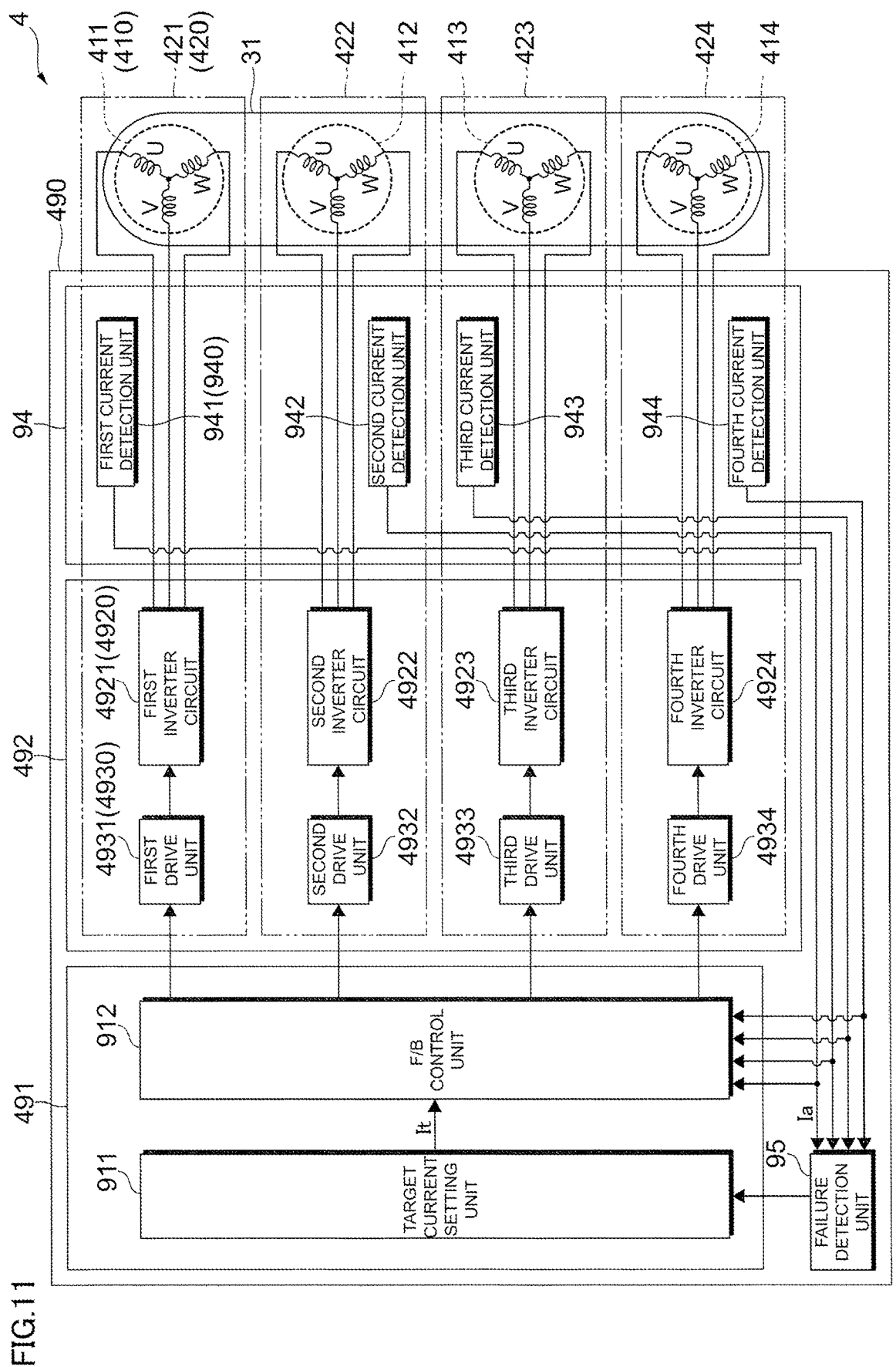
FIG. 11 shows schematic configurations of a control device and an electric motor of the steering device according to the fourth embodiment.

FIG. 11 shows schematic configurations of a control device 490 and an electric motor 31 of the steering device 4 according to the fourth embodiment.

The steering device 4 according to the fourth embodiment differs from the steering device 1 according to the first embodiment in that the steering device 4 includes only one electric motor 31 that is a quadruple three-phase motor composed of four winding sets of quadruple three-phase windings. Below a description will be given of differences of the steering device 4 from the steering device 1 according to the first embodiment. The same structures and functions between the steering device 1 according to the first embodiment and the steering device 4 according to the fourth embodiment are denoted by the respective same reference numerals and detailed description thereof will be omitted.

The steering device 4 according to the fourth embodiment includes an electric motor 31 and a conversion unit (not shown) converting a rotational driving force of the electric motor 31 into axial motion of the rack shaft 105.

(Electric Motor)

The electric motor 31 is a quadruple three-phase motor including four winding sets of quadruple three-phase windings composed of a first winding set 411, a second winding set 412, a third winding set 413, and a fourth winding set 414. A maximum output when only the first winding set 411 is energized, a maximum output when only the second winding set 412 is energized, a maximum output when only the third winding set 413 is energized, and a maximum output when only the fourth winding set 414 is energized are the same.

The first winding set 411, the second winding set 412, the third winding set 413, and the fourth winding set 414 may be each referred to as a "winding set 410" when it is not necessary to distinguish between them.

(Control Device)

The steering device 4 further includes a control device 490 to control an operation of the electric motor 31.

As shown in FIG. 11, the control device 490 includes a motor drive control unit 491 calculating a control amount by which the operation of the electric motor 31 is controlled, and a motor drive unit 492 driving the electric motor 31 on the basis of the control amount. The motor drive control unit 491 corresponds to the motor drive control unit 91 of the control device 90 of the steering device 1 according to the first embodiment.

Similarly to the control device 90 of the steering device 1 according to the first embodiment, the control device 490 further includes the current detection unit 94 and the failure detection unit 95.

(Motor Drive Unit)

The motor drive unit 492 includes a first inverter circuit 4921, a second inverter circuit 4922, a third inverter circuit 4923, and a fourth inverter circuit 4924 that supply power-supply voltage from a battery (not shown) installed in the automobile to the first winding set 411, the second winding set 412, the third winding set 413, and the fourth winding set 414, respectively, of the electric motor 31.

Hereinafter, the first inverter circuit 4921, the second inverter circuit 4922, the third inverter circuit 4923, and the fourth inverter circuit 4924 may be each referred to as an "inverter circuit 4920" when it is not necessary to distinguish between them.

Each inverter circuit 4920 has the same structure and function as each inverter circuit 920 according to the first embodiment.

The motor drive unit 492 further includes a first drive unit 4931 and a second drive unit 4932 that control driving of the first inverter circuit 4921 and the second inverter circuit 4922, respectively, on the basis of drive command signals from the motor drive control unit 491. The motor drive unit 492 further includes a third drive unit 4933 and a fourth drive unit 4934 that control driving of the third inverter circuit 4923 and the fourth inverter circuit 4924, respectively, on the basis of drive command signals from the motor drive control unit 491.

Hereinafter, the first drive unit 4931, the second drive unit 4932, the third drive unit 4933, and the fourth drive unit 4934 may be each referred to as a "drive unit 4930" when it is not necessary to distinguish between them.

Each drive unit 4930 has the same structure and function as each drive unit 930 according to the first embodiment.
(Drive System)

The above configured steering device 4 according to the fourth embodiment includes four drive systems of a first drive system 421, a second drive system 422, a third drive system 423, and a fourth drive system 424 that output driving forces for moving the rack shaft 105.

The first drive system 421 is composed of the first winding set 411 of the electric motor 31, the first inverter circuit 4921 and the first drive unit 4931 of the motor drive unit 492, and the first current detection unit 941 of the current detection unit 94.

The second drive system 422 is composed of the second winding set 412 of the electric motor 31, the second inverter circuit 4922 and the second drive unit 4932 of the motor drive unit 492, and the second current detection unit 942 of the current detection unit 94.

The third drive system 423 is composed of the third winding set 413 of the electric motor 31, the third inverter circuit 4923 and the third drive unit 4933 of the motor drive unit 492, and the third current detection unit 943 of the current detection unit 94.

The fourth drive system 424 is composed of the fourth winding set 414 of the electric motor 31, the fourth inverter circuit 4924 and the fourth drive unit 4934 of the motor drive unit 492, and the fourth current detection unit 944 of the current detection unit 94.

The first drive system 421, the second drive system 422, the third drive system 423, and the fourth drive system 424 may be each referred to as a "drive system 420" when it is not necessary to distinguish between them.

Similarly to the steering device 1 according to the first embodiment, the steering device 4 according to the fourth embodiment is set such that a total maximum driving force that is the sum of maximum driving forces of the first to fourth drive systems 421-424 is 4/3 times the maximum required driving force required to turn the front wheels 100. The maximum driving forces of the four drive systems 420 are the same.

Accordingly, when one of the four drive systems 420 is having a failure, the total maximum driving force that is output from the other properly working drive systems 420 without any failure is 3/3=1 times the maximum required driving force required to turn the front wheels 100.
(First Control Example)

In the first control example of the steering device 4 according to the fourth embodiment, when all of the drive systems 420 are working properly, the control device 490 controls driving forces of the drive systems 420 such that the total required driving force is output by three out of the four drive systems 420, similarly to the first control example of the steering device 1 according to the first embodiment. Also, the control device 490 controls such that all driving forces of the three drive systems 420 are the same.

When an error has occurred in one of the three drive systems 420, the control device 490 drives, in place of that drive system 420 having the failure, another drive system 420 that has not been driven at the time of occurrence of the failure.

As such, when an error has occurred while three drive systems 420 including three respective winding sets 410 of the electric motor 31 that includes three or more winding sets 410 each as an example of the winding are driven, the control device 490 as an example of the controller drives another drive system 420 including another winding set 410 that has not been driven in the electric motor 31.
(Second Control Example)

In the second control example of the steering device 4 according to the fourth embodiment, when all of the drive systems 420 are working properly, the control device 490 controls driving forces of the drive systems 420 such that the total required driving force is output by all four drive systems 420, similarly to the second control example of the steering device 1 according to the first embodiment.

The above configured steering device 4 according to the fourth embodiment includes the one electric motor 31 and the four drive systems 420, and the drive systems 420 each include the corresponding winding set 410 that outputs the driving force of the electric motor 31 by being energized. The electric motor 31 includes the four winding sets 410.

The steering device 4 according to the fourth embodiment further includes the control device 490 as an example the controller. In the event of a failure occurring in one of the four drive systems 420, the control device 490 controls driving forces of the other properly working drive systems 420 without any failure such that the required driving force required to turn the front wheels 100 with the automobile stationary is output from these properly working drive systems 420 out of the four drive systems 420.

In the steering device 4, the four drive systems 420 include three normal output drive systems (e.g., the first drive system 421, the second drive system 422, and the third drive system 423) each of which outputs a driving force to the electric motor 31 when none of the drive systems 420 are having a failure, and one backup drive system (e.g., the fourth drive system 424) that does not output a driving force to the electric motor 31 when none of the drive systems 420 are having a failure. In the first control example, when none of the normal output drive systems are having a failure, the control device 490 controls each of the normal output drive systems to output the maximum driving force, and when a failure has occurred in one of the three normal output drive systems, the control device 490 controls driving forces of the other properly working normal output drive systems so as to keep their respective ratios to the required driving force, and further controls the backup drive system to output the maximum driving force. Driving forces of the three drive systems 420 for driving the electric motor 31 are uniform.

In the second control example, when none of the drive systems 420 are having a failure, the control device 490 controls each of the drive systems 420 to output a driving force smaller than the maximum driving force, and when a failure has occurred in one of the four drive systems 420, the control device 490 controls each of the properly working drive systems 420 to output the maximum driving force. Also, when none of the drive systems 420 are having a failure, the control device 490 makes uniform all driving forces of the drive systems 420.

In the above configured steering device 4 according to the fourth embodiment, when a failure has occurred in one of the four drive systems 420, the assist force required for the steering device 4 (required assist force) is output from the other three drive systems 420. The total maximum driving force output from the three drive systems 420 is set equal to the maximum required driving force required to turn the front wheels 100. Thus, even when a failure has occurred in one of the drive systems 420, the front wheels 100 can be turned in the same manner as before the occurrence of the failure and the steering wheel 101 can continue to be operated. Also, as compared to a configuration in which a total of the maximum driving forces from three drive systems 420 is larger than the maximum required driving force, the above-described configuration can reduce the maximum driving force of each drive system 420, which in turn can reduce an output capacity of the electric motor 31. As a result, this can reduce the size of the electric motor 31 of the steering device 4 according to the fourth embodiment as compared to the configuration in which a total of the maximum driving forces from three drive systems 420 is larger than the maximum required driving force, and thus can improve mountability of the electric motor 31 onto vehicles (e.g., automobiles).

The steering device 4 according to the fourth embodiment includes only one electric motor 31 having the four sets of quadruple three-phase windings to implement the four drive systems 420. This helps downsize the steering device 4 at least by the size of one electric motor, as compared to using two electric motors to implement the four drive systems 420.

While, in the above embodiment, the control device 490 separate from the electric motor 31 includes the inverter circuits 4920, the present invention is not limited to this embodiment. The electric motor 31 may include the inverter circuits 4920. More specifically, the electric motor 31 may include the first inverter circuit 4921, the second inverter circuit 4922, the third inverter circuit 4923, and the fourth inverter circuit 4924 respectively supplying power-supply voltage to the first winding set 411, the second winding set 412, the third winding set 413, and the fourth winding set 414.

In that case, the electric motor 31 may include the first drive unit 4931, the second drive unit 4932, the third drive unit 4933, and the fourth drive unit 4934 respectively controlling driving of the first inverter circuit 4921, the second inverter circuit 4922, the third inverter circuit 4923, and the fourth inverter circuit 4924 of the electric motor 31.

Fifth Embodiment

Figure 12:
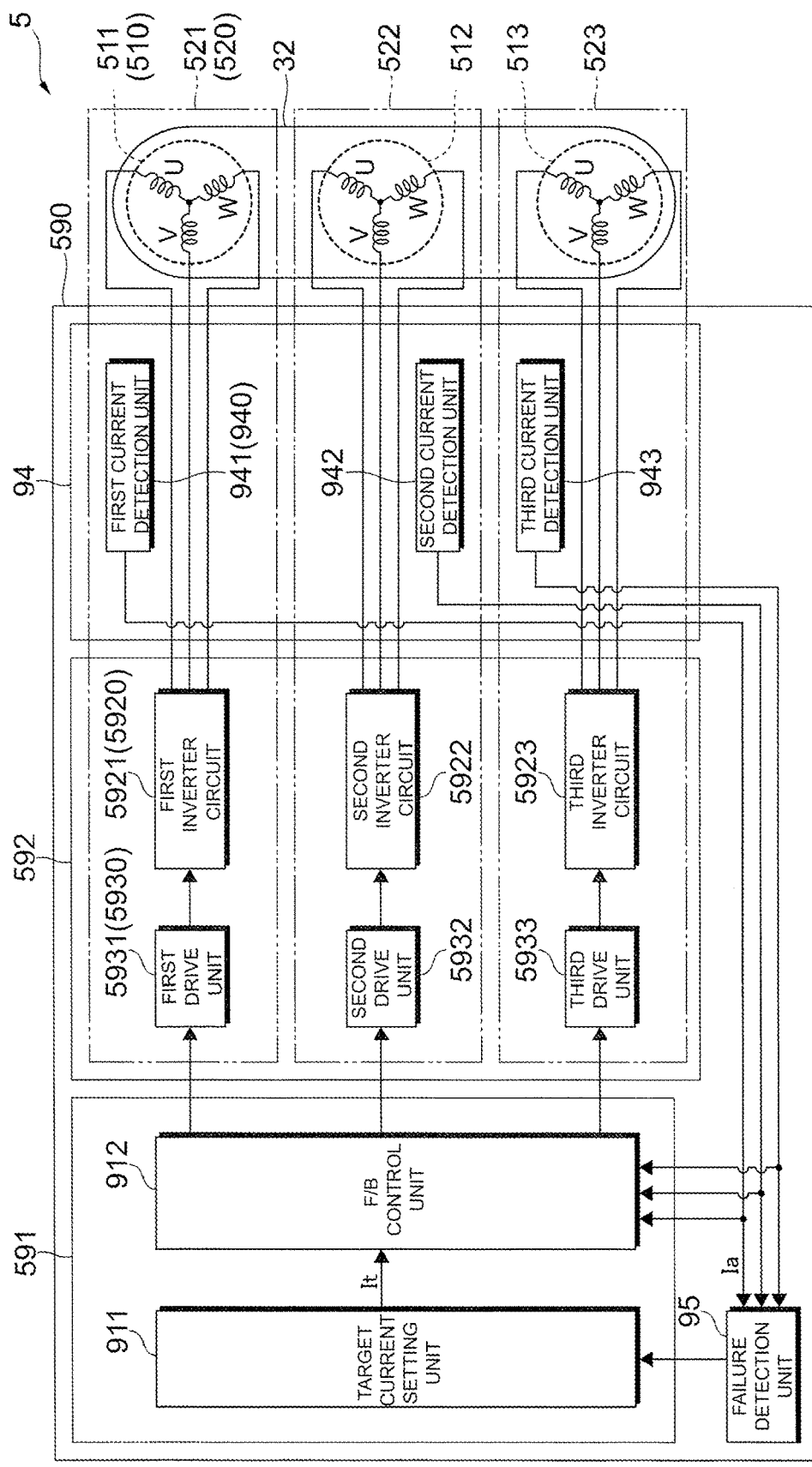
FIG. 12 shows schematic configurations of a control device and an electric motor of a steering device according to the fifth embodiment.

FIG. 12 shows schematic configurations of a control device 590 and an electric motor 32 of a steering device 5 according to the fifth embodiment.

The steering device 5 according to the fifth embodiment differs from the steering device 3 according to the third embodiment in that the steering device 5 includes only one electric motor 32 that is a triple three-phase motor composed of three winding sets of triple three-phase windings. Below a description will be given of differences of the steering device 5 from the steering device 3 according to the third embodiment. The same structures and functions between the steering device 3 according to the third embodiment and the steering device 5 according to the fifth embodiment are denoted by the respective same reference numerals and detailed description thereof will be omitted.

The steering device 5 according to the fifth embodiment includes an electric motor 32 and a conversion unit (not shown) converting a rotational driving force of the electric motor 32 into axial motion of the rack shaft 105.
(Electric Motor)

The electric motor 32 is a triple three-phase motor including three winding sets of triple three-phase windings composed of a first winding set 511, a second winding set 512, and a third winding set 513. A maximum output when only the first winding set 511 is energized, a maximum output when only the second winding set 512 is energized, and a maximum output when only the third winding set 513 is energized are the same.

The first winding set 511, the second winding set 512, and the third winding set 513 may be each referred to as a "winding set 510" when it is not necessary to distinguish between them.
(Control Device)

The steering device 5 further includes a control device 590 to control an operation of the electric motor 32.

As shown in FIG. 12, the control device 590 includes a motor drive control unit 591 calculating a control amount by which the operation of the electric motor 32 is controlled, and a motor drive unit 592 driving the electric motor 32 on the basis of the control amount. The motor drive control unit 591 corresponds to the motor drive control unit 391 of the control device 390 of the steering device 3 according to the third embodiment.

Similarly to the control device 390 of the steering device 3 according to the third embodiment, the control device 590 further includes the current detection unit 94 and the failure detection unit 95.
(Motor Drive Unit)

The motor drive unit 592 includes a first inverter circuit 5921, a second inverter circuit 5922, and a third inverter circuit 5923 that supply power-supply voltage from a battery (not shown) installed in the automobile to the first winding set 511, the second winding set 512, and the third winding set 513, respectively, of the electric motor 32.

Hereinafter, the first inverter circuit 5921, the second inverter circuit 5922, and the third inverter circuit 5923 may be each referred to as an "inverter circuit 5920" when it is not necessary to distinguish between them.

Each inverter circuit 5920 has the same structure and function as each inverter circuit 920 according to the first embodiment.

The motor drive unit 592 further includes a first drive unit 5931, a second drive unit 5932, and a third drive unit 5933 that control driving of the first inverter circuit 5921, the second inverter circuit 5922, and the third inverter circuit 5923, respectively, on the basis of drive command signals from the motor drive control unit 591.

Hereinafter, the first drive unit 5931, the second drive unit 5932, and the third drive unit 5933 may be each referred to as a "drive unit 5930" when it is not necessary to distinguish between them.

Each drive unit 5930 has the same structure and function as each drive unit 930 according to the first embodiment.
(Drive System)

The above configured steering device 5 according to the fifth embodiment includes three drive systems of a first drive system 521, a second drive system 522, and a third drive system 523 that output driving forces for moving the rack shaft 105.

The first drive system 521 is composed of the first winding set 511 of the electric motor 32, the first inverter circuit 5921 and the first drive unit 5931 of the motor drive unit 592, and the first current detection unit 941 of the current detection unit 94.

The second drive system 522 is composed of the second winding set 512 of the electric motor 32, the second inverter circuit 5922 and the second drive unit 5932 of the motor drive unit 592, and the second current detection unit 942 of the current detection unit 94.

The third drive system 523 is composed of the third winding set 513 of the electric motor 32, the third inverter circuit 5923 and the third drive unit 5933 of the motor drive unit 592, and the third current detection unit 943 of the current detection unit 94.

The first drive system 521, the second drive system 522, and the third drive system 523 may be each referred to as a "drive system 520" when it is not necessary to distinguish between them.

The steering device 5 according to the fifth embodiment is set such that a total maximum driving force that is the sum of maximum driving forces of the first to third drive systems 521-523 is 3/2 times the maximum required driving force required to turn the front wheels 100. The maximum driving forces of the three drive systems 520 are the same.

Accordingly, when one of the three drive systems 520 is having a failure, the total maximum driving force that is output from the other properly working drive systems 520 without any failure is 2/2=1 times the maximum required driving force required to turn the front wheels 100.

(First Control Example)

In the first control example of the steering device 5 according to the fifth embodiment, when all of the drive systems 520 are working properly, the control device 590 controls driving forces of the drive systems 520 such that the total required driving force is output by two out of the three drive systems 520, similarly to the first control example of the steering device 3 according to the third embodiment. Also, the control device 590 controls such that all driving forces of the two drive systems 520 are the same.

When an error has occurred in one of the two drive systems 520, the control device 590 drives, in place of that drive system 520 having the failure, another drive system 520 that has not been driven at the time of occurrence of the failure.

As such, when an error has occurred while two drive systems 520 including two respective winding sets 510 of the electric motor 32 that includes three or more winding sets 510 each as an example of the winding are driven, the control device 590 as an example of the controller drives another drive system 520 including another winding set 510 that has not been driven in the electric motor 32.

(Second Control Example)

In the second control example of the steering device 5 according to the fifth embodiment, when all of the drive systems 520 are working properly, the control device 590 controls driving forces of the drive systems 520 such that the total required driving force is output by all three drive systems 520, similarly to the second control example of the steering device 3 according to the third embodiment.

The above configured steering device 5 according to the fifth embodiment includes the one electric motor 32 and the three drive systems 520, and the drive systems 520 each include the corresponding winding set 510 that outputs the driving force of the electric motor 32 by being energized. The electric motor 32 includes the three winding sets 510.

The steering device 5 according to the fifth embodiment further includes the control device 590 as an example the controller. In the event of a failure occurring in one of the three drive systems 520, the control device 590 controls driving forces of the other properly working drive systems 520 without any failure such that the required driving force required to turn the front wheels 100 with the automobile stationary is output from these properly working drive systems 520 out of the three drive systems 520.

In the steering device 5, the three drive systems 520 include two normal output drive systems (e.g., the first drive system 521 and the second drive system 522) each of which outputs a driving force to the electric motor 32 when none of the drive systems 520 are having a failure, and one backup drive system (e.g., the third drive system 523) that does not output a driving force to the electric motor 32 when none of the drive systems 520 are having a failure. In the first control example, when none of the normal output drive systems are having a failure, the control device 590 controls each of the normal output drive systems to output the maximum driving force, and when a failure has occurred in one of the two normal output drive systems, the control device 590 controls a driving force of the other properly working normal output drive system so as to keep its ratio to the required driving force, and further controls the backup drive system to output the maximum driving force. Driving forces of the two drive systems 520 for driving the electric motor 32 are uniform.

In the second control example, when none of the drive systems 520 are having a failure, the control device 590 controls each of the drive systems 520 to output a driving force smaller than the maximum driving force, and when a failure has occurred in one of the three drive systems 520, the control device 590 controls each of the properly working drive systems 520 to output the maximum driving force. Also, when none of the drive systems 520 are having a failure, the control device 590 makes uniform all driving forces of the drive systems 520.

In the above configured steering device 5 according to the fifth embodiment too, when a failure has occurred in one of the three drive systems 520, the assist force required for the steering device 5 (required assist force) is output from the other two drive systems 520. The total maximum driving force output from the two drive systems 520 is set equal to the maximum required driving force required to turn the front wheels 100. Thus, even when a failure has occurred in one of the drive systems 520, the front wheels 100 can be turned in the same manner as before the occurrence of the failure and the steering wheel 101 can continue to be operated. Also, as compared to a configuration in which a total of the maximum driving forces from two drive systems 520 is larger than the maximum required driving force, the above-described configuration can reduce the maximum driving force of each drive system 520, which in turn can reduce an output capacity of the electric motor 32. As a result, this can reduce the size of the electric motor 32 of the steering device 5 according to the fifth embodiment as compared to the configuration in which a total of the maximum driving forces from two drive systems 520 is larger than the maximum required driving force, and thus can improve mountability of the electric motor 32 onto vehicles (e.g., automobiles).

Sixth Embodiment

Figure 13:
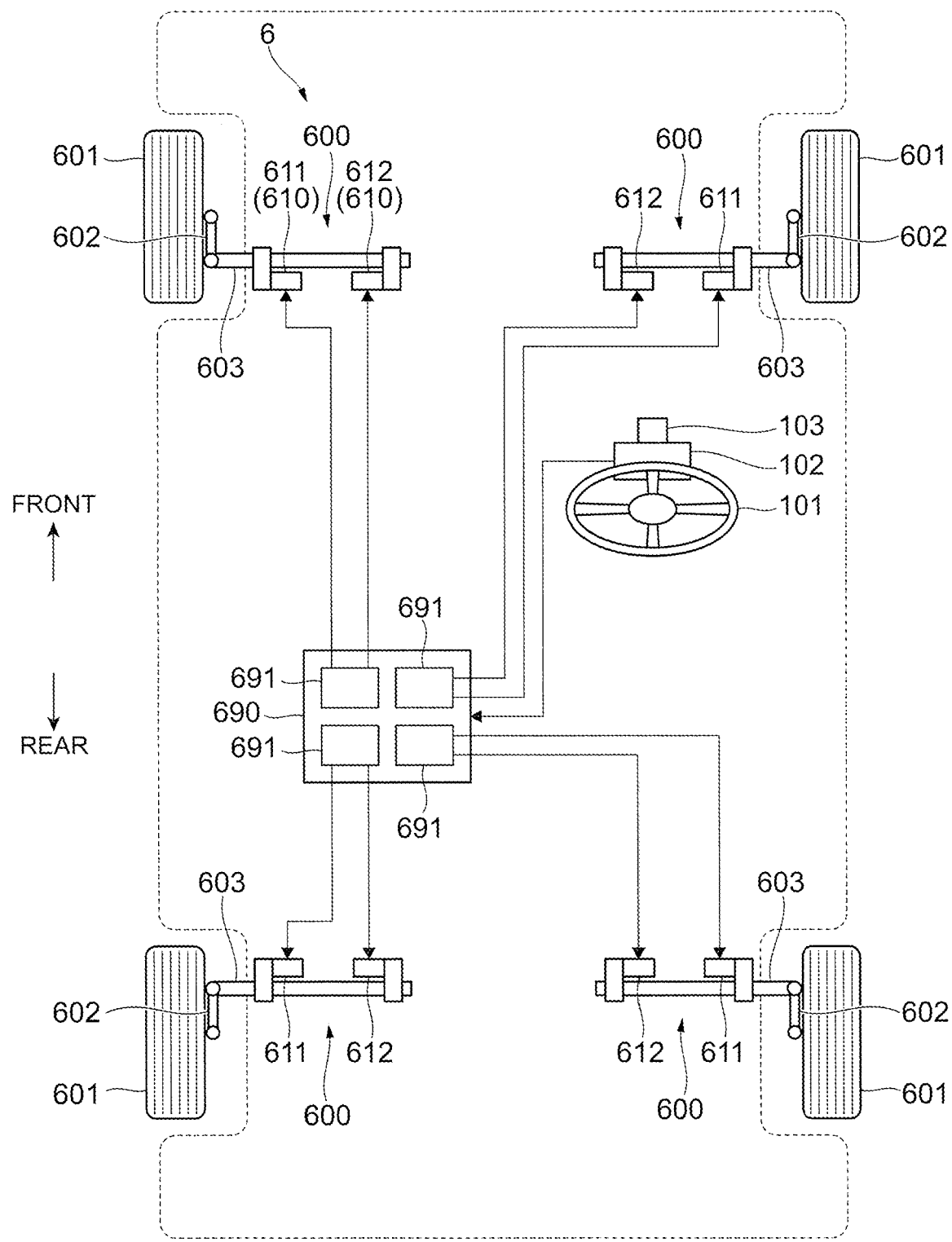
FIG. 13 shows a schematic configuration of a steering device according to the sixth embodiment.

FIG. 13 shows a schematic configuration of a steering device 6 according to the sixth embodiment. FIG. 13 illustrates the vehicle as viewed from above.

Figure 14:
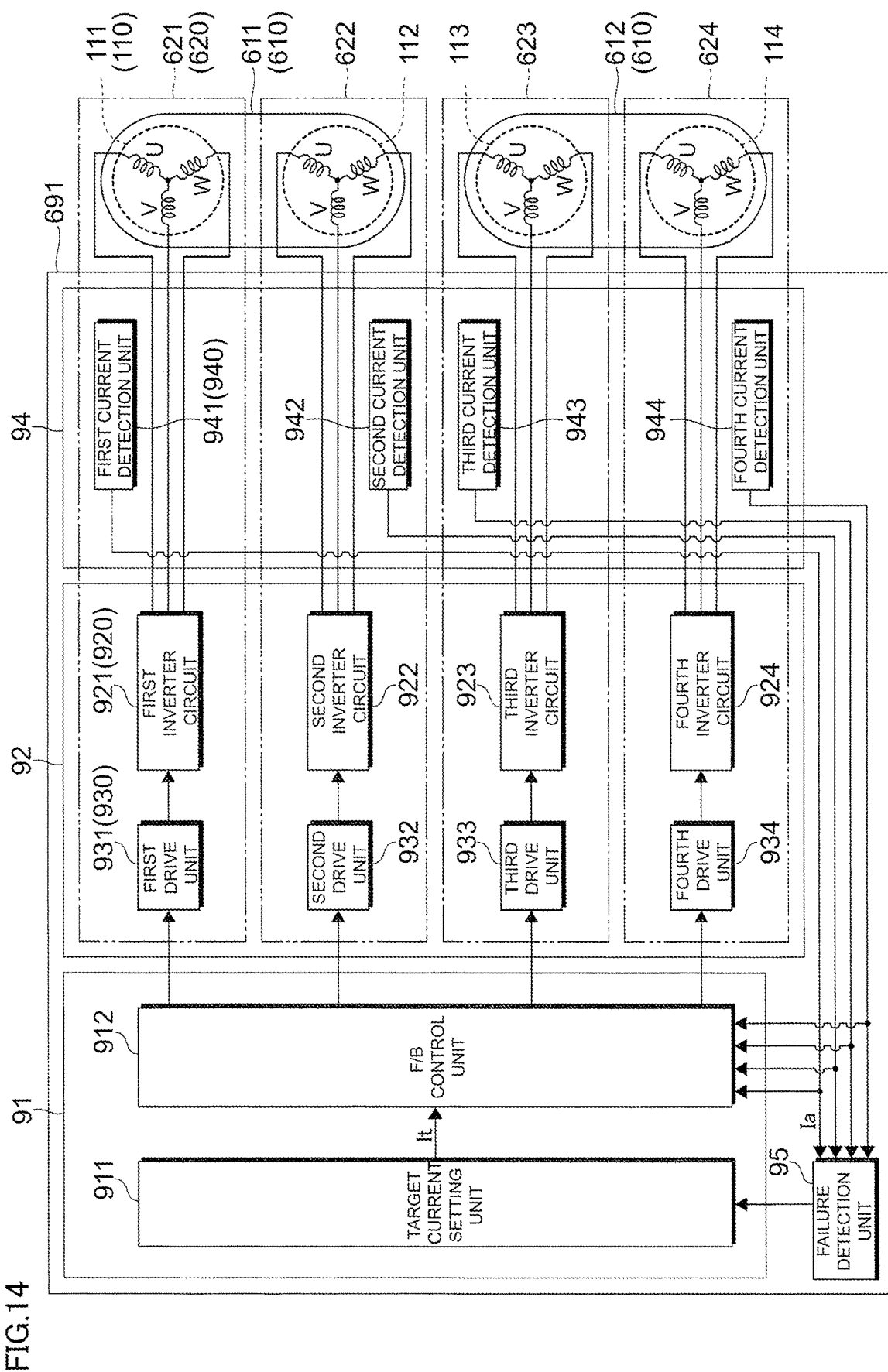
FIG. 14 shows schematic configurations of a control unit and electric motors of the steering device according to the sixth embodiment.

FIG. 14 shows schematic configurations of a control device 691 and electric motors 610 of the steering device 6 according to the sixth embodiment.

The steering device 6 according to the sixth embodiment differs from the steering device 1 according to the first embodiment in that the steering device 6 has different steering mechanisms; the steering device 6 includes four steering mechanisms 600 for independently steering a left front wheel, a right front wheel, a left rear wheel, and a right rear wheel, respectively. The steering device 6 according to the sixth embodiment also differs in that it includes a control unit 690 to control driving of the four steering mechanisms 600. Below a description will be given of differences of the steering device 6 from the steering device 1 according to the third embodiment. The same structures and functions between the steering device 1 according to the first embodiment and the steering device 6 according to the sixth embodiment are denoted by the respective same reference numerals and detailed description thereof will be omitted.

Each steering mechanism 600 includes a rod 603 connected to a knuckle arm 602 fixed to the corresponding wheel 601 (the left front wheel, the right front wheel, the left rear wheel, or the right rear wheel). Each steering mechanism 600 further includes two electric motors of a first electric motor 611 and a second electric motor 612, and two conversion units (not shown) converting rotational driving forces of the first electric motor 611 and the second electric motor 612, respectively, into axial motion of the rod 603. Hereinafter, the first electric motor 611 and the second electric motor 612 may be each referred to as an "electric motor 610" when it is not necessary to distinguish between them.

Each conversion unit includes a driving pulley (not shown) mounted on an output shaft of the corresponding electric motor 610, a number of balls (not shown), and a ball nut (not shown) attached via the balls to a ball screw (not shown) formed on the rod 603. Each conversion unit further includes a driven pulley (not shown) rotating together with the ball nut, and an endless belt (not shown) stretched between the driving pulley and the driven pulley.

The first electric motor 611 is a double three-phase motor including the first winding set 111 and the second winding set 112, similarly to the first electric motor 11 of the steering device 1 according to the first embodiment.

The second electric motor 612 is a double three-phase motor including the third winding set 113 and the fourth winding set 114, similarly to the second electric motor 12 of the steering device 1 according to the first embodiment.
(Drive System)

The steering device 6 according to the sixth embodiment includes four drive systems of a first drive system 621, a second drive system 622, a third drive system 623, and a fourth drive system 624 that output driving forces for moving the corresponding rod 603 and eventually turning the corresponding wheel 601.

The first drive system 621 is composed of the first winding set 111 of the first electric motor 611, the first inverter circuit 921 and the first drive unit 931 of the motor drive unit 92, and the first current detection unit 941 of the current detection unit 94.

The second drive system 622 is composed of the second winding set 112 of the first electric motor 611, the second inverter circuit 922 and the second drive unit 932 of the motor drive unit 92, and the second current detection unit 942 of the current detection unit 94.

The third drive system 623 is composed of the third winding set 113 of the second electric motor 612, the third inverter circuit 923 and the third drive unit 933 of the motor drive unit 92, and the third current detection unit 943 of the current detection unit 94.

The fourth drive system 624 is composed of the fourth winding set 114 of the second electric motor 612, the fourth inverter circuit 924 and the fourth drive unit 934 of the motor drive unit 92, and the fourth current detection unit 944 of the current detection unit 94.

The first drive system 621, the second drive system 622, the third drive system 623, and the fourth drive system 624 may be each referred to as a "drive system 620" when it is not necessary to distinguish between them.

The steering device 6 according to the sixth embodiment is set such that a total maximum driving force that is the sum of maximum driving forces of the first drive system 621, the second drive system 622, the third drive system 623, and the fourth drive system 624 is 4/3 times a maximum required driving force required to turn the corresponding wheel 601, similarly to the steering device 1 according to the first embodiment. The maximum driving forces of the four drive systems 620 are the same. The maximum required driving force refers to a driving force by which the wheel 601 is made to turn up to a predetermined maximum turning angle when the steering wheel is turned up to a predetermined maximum steering angle with the automobile stationary on a road surface having a predetermined friction coefficient (e.g., asphalt road) with the vehicle speed Vc, which is a moving speed of the automobile, being zero. The maximum required driving force varies depending on the kind of the vehicle (e.g., automobile).

The control unit 690 includes as many control devices 691 as the number of steering mechanisms 600, namely four control devices 691. Each control device 691 corresponds to the control device 90 of the steering device 1 according to the first embodiment. Each control device 691 controls the four drive systems 620 of the corresponding steering mechanism 600.

In the first control example, when all of the four drive systems 620 are working properly, the control device 691 controls driving forces of the drive systems 620 such that the total required driving force is output by three out of the four drive systems 620. When an error has occurred in one of the three drive systems 620, the control device 691 may drive, in place of that drive system 620 having the failure, another drive system 620 that has not been driven at the time of occurrence of the failure.

In the second control example, when all of the four drive systems 620 are working properly, the control device 691 controls driving forces of the drive systems 620 such that the total required driving force is output by all four drive systems 620. When a failure has occurred in one of the four drive systems 620, the control device 691 may control driving forces of the other properly working three drive systems 620 without any failure such that the total required driving force is output by these three drive systems 620.

Put another way, the steering device 6 according to the sixth embodiment has a configuration in which the drive systems 620 and the control device 691 respectively corresponding to the drive systems 20 and the control device 90 of the steering device 1 according to the first embodiment are applied to each steering mechanism 600 independently steering the corresponding wheel 601.

The drive systems 20 and the control device 90 of the steering device 1 according to the first embodiment are not the only ones applicable to each steering mechanism 600. For example, the drive systems 220 and the control device 290 of the steering device 2 according to the second embodiment may be applied to each steering mechanism 600. Alternatively, the drive systems 320 and the control device 390 of the steering device 3 according to the third embodiment may be applied to each steering mechanism 600. Still alternatively, the drive systems 420 and the control device 490 of the steering device 4 according to the fourth embodiment may be applied to each steering mechanism 600. Still alternatively, the drive systems 520 and the control device 590 of the steering device 5 according to the fifth embodiment may be applied to each steering mechanism 600.

In the above steering devices 1-6 according to the first to sixth embodiments, the three or four drive systems (e.g., the drive systems 20) are constituted using the electric motor(s) (e.g., the electric motors 10) including two, three, or four sets of double, triple, or quadruple three-phase windings. However, this is by way of example only and the present invention is not limited to these embodiments. Alternatively, the steering device may include five or more drive systems and accordingly five or more sets of three-phase windings to implement the five or more drive systems.

The above steering devices 1-6 according to the first to sixth embodiments are each a rack-assist type device that converts the driving force of the electric motor(s) (e.g., the electric motors 10) into linear movement of the rack shaft 105 or the rod 603 via conversion unit(s) including a belt and the like. However, the present invention is not limited to these embodiments. The steering device may be a pinion-assist type steering device that includes a pinion shaft formed with a pinion constituting a rack and pinion mechanism with rack teeth formed on the rack shaft 105 or the rod 603 and rotates the pinion shaft by the driving force of the electric motor(s) (e.g., the electric motors 10) to thereby move the rack shaft 105 or the rod 603.

The steering devices 1-3 and 6 according to the first to third and sixth embodiments are each a rack-assist type device that converts both of the driving forces of the two electric motors (e.g., the electric motors 10) into movement of the rack shaft 105 or the rod 603. However, the present invention is not limited to these embodiments. The steering device may function as both of a rack-assist type device that converts the driving force of one of the two electric motors into movement of the rack shaft 105 or the rod 603 via a conversion unit including a belt and the like and a pinion-assist type device that converts the driving force of the other of the two electric motors into movement of the rack shaft 105 or the rod 603 via a pinion shaft.

The steering devices 1-3 and 6 according to the first to third and sixth embodiments each include two conversion units including respective belts and the like and converting respective driving forces of the two electric motors (e.g., the electric motors 10) into movement of the rack shaft 105 or the rod 603. However, the present invention is not limited to these embodiments. For example, a configuration is also possible in which driving forces of the two electric motors are converted into movement of the rack shaft 105 or the rod 603 by a single belt.

REFERENCE SIGNS LIST

1, 2, 3, 4, 5, 6 Steering device
10, 13, 16, 31, 32 Electric motor
20, 220, 320, 420, 520, 620 Drive system
90, 290, 390, 490, 590, 691 Control device
110, 210, 310, 410, 510, 610 Winding set

The invention claimed is:

1. A steering device comprising:
one or more electric motors configured to be driven to turn wheels of a vehicle; and
three or more drive systems each configured to output a driving force for driving a corresponding one of the electric motors to the corresponding one of the electric motors, wherein
a total of maximum driving forces each of which is a maximum value of a driving force of each drive system of the steering device is set larger than a required driving force, said required driving force being a force that is required to turn the wheels to a predetermined maximum turning angle with the vehicle stationary, and
in an event of a failure occurring in one of the three or more drive systems, a total of the maximum driving forces of other properly working drive systems out of the three or more drive systems amounts to the required driving force.

2. The steering device according to claim 1, wherein
the one or more electric motors comprise one electric motor, and the three or more drive systems comprise three drive systems,
each of the drive systems includes a winding set configured to output a driving force of the electric motor by being energized, and
the electric motor includes three said winding sets.

3. The steering device according to claim 1, wherein
the one or more electric motors comprise one electric motor, and the three or more drive systems comprise four drive systems,
each of the drive systems includes a winding set configured to output a driving force of the electric motor by being energized, and
the electric motor includes four said winding sets.

4. The steering device according to claim 1, wherein
the one or more electric motors comprise two electric motors, and the three or more drive systems comprise four drive systems,
each of the drive systems includes a winding set configured to output a driving force of a corresponding one of the two electric motors by being energized, and
a first electric motor of the two electric motors includes two said winding sets, and a second electric motor of the two electric motors includes two said winding sets.

5. The steering device according to claim 1, wherein
the one or more electric motors comprise two electric motors, and the three or more drive systems comprise four drive systems,
each of the drive systems includes a winding set configured to output a driving force of a corresponding one of the two electric motors by being energized, and
a first electric motor of the two electric motors includes three said winding sets, and a second electric motor of the two electric motors includes one said winding set.

6. The steering device according to claim 1, wherein
the one or more electric motors comprise two electric motors, and the three or more drive systems comprise three drive systems,
each of the drive systems includes a winding set configured to output a driving force of a corresponding one of the two electric motor by being energized, and
a first electric motor of the two electric motors includes two said winding sets, and a second electric motor of the two electric motors includes one said winding set.

7. The steering device according to claim 1, wherein
the three or more drive systems are configured to output driving forces whose total is $n/(n-1)$ times a maximum required driving force required to turn the wheels, where n is the number of the three or more drive systems.

8. The steering device according to claim 1, wherein
in the event of the failure occurring in one of the three or more drive systems, the steering device is configured to drive a drive system that has not been driven at the time of failure without changing a ratio of the driving force of each of the properly working drive systems that have been driven at the time of the failure.

\* \* \* \* \*